United States Patent
Yoo et al.

(10) Patent No.: US 8,941,789 B2
(45) Date of Patent: Jan. 27, 2015

(54) LIQUID CRYSTAL DISPLAY

(75) Inventors: Young-Hoon Yoo, Suwon-si (KR);
Hee-Suk Lee, Cheonan-si (KR);
Woo-Sung Sohn, Seoul (KR)

(73) Assignee: Samsung Display Co., Ltd. (KR)

( * ) Notice: Subject to any disclaimer, the term of this patent is extended or adjusted under 35 U.S.C. 154(b) by 1192 days.

(21) Appl. No.: 11/341,940

(22) Filed: Jan. 26, 2006

(65) Prior Publication Data

US 2006/0164352 A1  Jul. 27, 2006

(30) Foreign Application Priority Data

Jan. 26, 2005  (KR) .................... 10-2005-0007124

(51) Int. Cl.
*G02F 1/1343* (2006.01)
*G02F 1/1337* (2006.01)
*G09G 3/36* (2006.01)
*G02F 1/1362* (2006.01)

(52) U.S. Cl.
CPC .......... *G09G 3/3614* (2013.01); *G02F 1/13624* (2013.01); *G09G 3/3607* (2013.01); *G02F 2001/134345* (2013.01); *G09G 3/3688* (2013.01); *G09G 2300/0447* (2013.01)
USPC .............. 349/39; 349/38; 349/129; 349/143; 349/144

(58) Field of Classification Search
USPC .............. 349/48, 146, 129, 38–39, 143–144; 345/89, 96, 87, 90, 92–93
See application file for complete search history.

(56) References Cited

U.S. PATENT DOCUMENTS

| | | | |
|---|---|---|---|
| 5,132,820 A * | 7/1992 | Someya et al. ................. | 349/43 |
| 5,701,166 A | 12/1997 | Fedorovish et al. | |
| 5,805,128 A | 9/1998 | Kim et al. | |
| 6,067,063 A * | 5/2000 | Kim et al. ....................... | 345/89 |
| 6,922,183 B2 * | 7/2005 | Ting et al. ....................... | 345/87 |
| 7,426,006 B2 * | 9/2008 | Lai ................................. | 349/129 |
| 7,567,325 B2 * | 7/2009 | Ono et al. ...................... | 349/139 |
| 2003/0071952 A1 * | 4/2003 | Yoshida et al. ................ | 349/141 |
| 2003/0107687 A1 * | 6/2003 | Choo et al. ..................... | 349/39 |
| 2003/0227429 A1 * | 12/2003 | Shimoshikiryo .............. | 345/90 |
| 2004/0085272 A1 | 5/2004 | Ting et al. | |
| 2004/0212751 A1 * | 10/2004 | Lee ................................. | 349/42 |
| 2004/0212753 A1 * | 10/2004 | Wu ................................. | 349/54 |
| 2004/0233368 A1 * | 11/2004 | Kim et al. ..................... | 349/139 |
| 2004/0239856 A1 * | 12/2004 | Miyachi ....................... | 349/129 |

(Continued)

FOREIGN PATENT DOCUMENTS

CN 1482507 3/2004
CN 1694152 A 11/2005

(Continued)

*Primary Examiner* — Nathanael R Briggs
(74) *Attorney, Agent, or Firm* — Cantor Colburn LLP

(57) ABSTRACT

A liquid crystal display apparatus includes a plurality of pixels having first and second subpixels, a plurality of gate lines connected to the first and second subpixels to transmit gate signals, a plurality of first data lines intersecting the gate lines and connected to the first subpixels to transmit first data voltages, and a plurality of second data lines intersecting the gate lines and connected to the second subpixels to transmit second data voltages. The first and second data voltages have different sizes and are obtained from single image information. Each pixel is divided into a pair of subpixels, and different data voltages are applied to the subpixels through two different data lines, so that it is possible to secure a wide viewing angle and improve side visibility.

44 Claims, 21 Drawing Sheets

(56) References Cited

U.S. PATENT DOCUMENTS

| | | | |
|---|---|---|---|
| 2005/0012872 A1* | 1/2005 | Baek | 349/38 |
| 2005/0046764 A1* | 3/2005 | Enda et al. | 349/43 |
| 2006/0146243 A1* | 7/2006 | Nakanishi et al. | 349/139 |
| 2011/0025937 A1* | 2/2011 | Yagi et al. | 349/39 |

FOREIGN PATENT DOCUMENTS

| | | |
|---|---|---|
| JP | 02039030 A | 2/1990 |
| JP | 04102830 A | 4/1992 |
| JP | 04318522 A | 11/1992 |
| JP | 05341734 A | 12/1993 |
| JP | 09281465 A | 10/1997 |
| JP | 10-142629 A | 5/1998 |
| JP | 2000235371 A | 8/2000 |
| JP | 2000-338463 A | 12/2000 |
| JP | 2000-338918 A | 12/2000 |
| JP | 2002-023132 A | 1/2002 |
| JP | 2002026333 A | 1/2002 |
| JP | 2002131784 | 5/2002 |
| JP | 2002350900 A | 12/2002 |
| JP | 2003-186017 A | 7/2003 |
| JP | 2003295160 | 10/2003 |
| JP | 2004-013153 A | 1/2004 |
| JP | 2004062146 A | 2/2004 |
| JP | 2004-078157 A | 3/2004 |
| JP | 2004-170919 A | 6/2004 |
| JP | 2004157543 | 6/2004 |
| JP | 2004-354940 A | 12/2004 |
| JP | 2005004212 A | 1/2005 |
| JP | 2005-099733 A | 4/2005 |
| JP | 2005-316211 A | 11/2005 |
| KR | 1020040084019 A | 10/2004 |
| TW | I383233 B | 1/2013 |

* cited by examiner

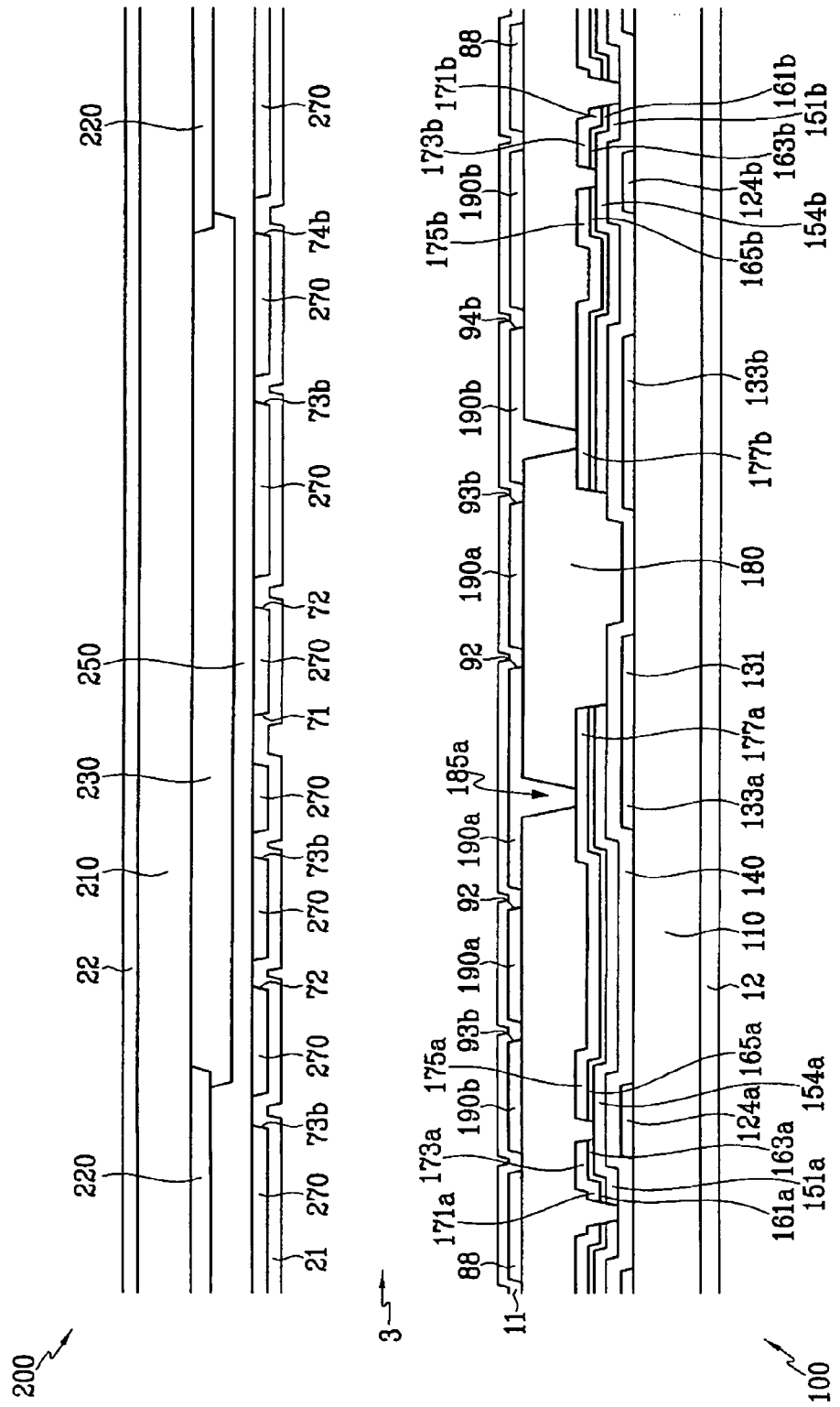

LIQUID CRYSTAL DISPLAY

This application claims priority to Korean Patent Application No. 10-2005-0007124, filed on Jan. 26, 2005 and all the benefits accruing therefrom under 35 U.S.C. §119, and the contents of which in its entirety are herein incorporated by reference.

BACKGROUND OF THE INVENTION (a) Field of the Invention

The present invention relates to a thin film transistor ("TFT") panel and a liquid crystal display ("LCD") apparatus. More particularly, the present invention relates to a TFT panel and an LCD apparatus capable of improving side visibility without a decrease in transmittance.

(b) Description of the Related Art

An LCD apparatus, which is one of the most widely used flat panel display apparatuses, includes two panels having electric field generating electrodes, such as pixel electrodes and a common electrode, and a liquid crystal layer interposed therebetween. The LCD apparatus displays an image by applying a voltage to the electric field generating electrodes to generate an electric field in the liquid crystal layer and determining alignment of liquid crystal molecules in the liquid crystal layer to control polarization of incident light. In the LCD apparatus, by applying the voltage to the two electrodes to generate the electric field in the liquid crystal layer, a desired image is obtained by adjusting an intensity of the electric field to adjust transmittance of light passing through the liquid crystal layer. At this time, in order to prevent a deterioration phenomena caused by applying the electric field to the liquid crystal layer in one direction for an extended time, the polarities of the data voltages with respect to the common voltage are inverted in units of a frame, a row, or a pixel.

Among such LCD apparatuses, an LCD apparatus with a vertical alignment mode, in which liquid crystal molecules are arranged such that major axes of the liquid crystal molecules are perpendicular to the upper and lower panels in a state when no electric field is generated, is of interest, since it has a high contrast ratio and can easily provide a wide reference viewing angle. Here, the reference viewing angle means a viewing angle having a contrast ratio of 1:10 or an effective angle in inversion of brightness between gray scales.

Methods of embodying a wide viewing angle in an LCD apparatus with a vertical alignment mode include a method of forming apertures in the electric field generating electrodes and a method of forming protrusions on the electric field generating electrodes. Since the direction in which the liquid crystal molecules are tilted can be determined by the use of the apertures and the protrusions, the reference viewing angle can be widened by variously arranging the apertures and the protrusions to distribute the tilt direction of the liquid crystal molecules in various directions.

However, the LCD apparatus with a vertical alignment mode has side visibility lower than front visibility. For example, in the case of an LCD apparatus with a patterned vertical alignment ("PVA") mode having apertures, an image becomes brighter toward the side, and in some cases, the difference in brightness between high gray scales may disappear rendering the profile of the image vague.

In order to solve such problems, there has been proposed a technique for providing different transmittances by dividing one pixel into two subpixels, coupling the two subpixels in a capacitive manner, and providing different voltages to the two subpixels by directly applying a voltage to the one subpixel and dropping a voltage in the other subpixel due to the capacitive coupling.

However, in the above technique, the transmittances of the two subpixels cannot be accurately adjusted.

In particular, the transmittances of different colors of light are different from each other. However, it is difficult to obtain different voltage combinations for different colors. In addition, since conductive members for the capacitive coupling must be added, an aperture ratio deteriorates and, due to a voltage drop caused by the capacitive coupling, the transmittance decreases.

BRIEF SUMMARY OF THE INVENTION

The present invention provides a TFT panel and an LCD apparatus capable of improving side visibility without a decrease in transmittance.

According to exemplary embodiments of the present invention, there is provided an LCD apparatus including a plurality of pixels having first and second subpixels, a plurality of gate lines connected to the first and second subpixels to transmit gate signals to the first and second subpixels, a plurality of first data lines intersecting the gate lines and connected to the first subpixels to transmit first data voltages to the first subpixels, and a plurality of second data lines intersecting the gate lines and connected to the second subpixels to transmit second data voltages to the second subpixels, wherein the first and second data voltages have different sizes and are obtained from single image information.

In the above described exemplary embodiments of the present invention, each of the first subpixels may include a first switching device connected to a gate line and a first data line and a first subpixel electrode connected to the first switching device, and each of the second subpixels includes a second switching device connected to the gate line and a second data line and a second subpixel electrode connected to the second switching device.

In addition, at least one of the first and second subpixel electrodes may have an aperture.

In addition, the first subpixel and the second subpixel may further include a common electrode facing the first and second subpixel electrodes.

In addition, the common electrode may have an aperture or a protrusion.

In addition, the LCD apparatus may further include a shielding electrode, at least a portion of the shielding electrode may overlap the first and second data lines and may be electrically insulated from the first and second data lines.

In addition, an area of the first subpixel electrode may be different from an area of the second subpixel electrode.

In addition, at least one of the first and second data lines may be disposed between the first and second subpixel electrodes.

In addition, a ratio of a transverse length and a longitudinal length of each pixel may be substantially equal to 1:3.

In addition, the first subpixel and the second subpixel are arranged in a transverse direction and a transverse length of the first subpixels may be different from a transverse length of the second subpixels.

In addition, the LCD apparatus may further include first and second color filters facing the first and second subpixel electrodes respectively, wherein the first and second color filters have the same color.

In addition, the first and second data lines may be disposed at opposite sides of each pixel.

In addition, the first and second data voltages may have the same polarity.

In addition, the first and second data voltages may have opposite polarities.

In addition, the first and second data lines may be disposed adjacent a same side of each pixel.

In addition, the first and second data voltages may have the same polarity.

In addition, the LCD apparatus may further include a bridge wire connected between the second data line and the second switching device, wherein the second data line is farther from the pixel than the first data line.

In addition, the bridge wire and the gate line may comprise the same metal layer, and the bridge wire may be connected to a portion of the second data line and an end of the second switching device through conductive members including the same metal layer as the first and second subpixel electrodes.

In addition, the second data line may include a first portion and a second portion separated from each other, and ends of the first and second portions of the second data line may overlap a first end portion of the bridge wire.

In addition, a second end portion of the bridge wire may be overlapped by a source electrode of the second switching device.

In addition, each pixel may have a substantially rectangular shape, and the first and second subpixels may each have a substantially non-rectangular shape.

In addition, the first subpixel electrode may have a shape nested within a shape of the second subpixel electrode, and a gap may separate the first subpixel electrode from the second subpixel electrode.

In addition, the LCD apparatus may further include a storage electrode line substantially parallel to the gate line, wherein the first subpixel electrode is connected to the first switching device via a first contact hole positioned at a location corresponding to the storage electrode line, and the second subpixel electrode is connected to the second switching device via a second contact hole positioned between the storage electrode line and the gate line.

In addition, the LCD apparatus may be driven at a same frequency as a frequency of an input image signal of the image information.

In addition, the LCD apparatus may further include a signal controller processing the image information and generating first and second image signals, and a data driver applying the first and second data voltages corresponding to the first and second image signals to the first and second data lines, respectively.

In addition, the LCD apparatus may further include a plurality of pixels, and a pair of data lines positioned between each pair of adjacent pixels.

According to other exemplary embodiments of the present invention, there is provided an LCD apparatus including gate lines extending in a first direction, first and second data lines extending in a second direction and separated from each other, first TFTs connected to the gate lines and the first data lines, second TFTs connected to the gate lines and the second data lines, and first and second display electrodes connected to the first and second TFTs respectively, wherein a second direction length of the second display electrode is larger than a first direction length of the first display electrode, and the first display electrode is located within the second direction length of the second display electrode.

In the above aspect of the present invention, the first and second display electrodes may have slanted sides facing each other.

In addition, the first display electrode may have a shape nested within a shape of the second display electrode.

In addition, at least one of the first and second display electrodes may have an aperture.

In addition, the LCD apparatus may further include a third display electrode facing the first and second display electrodes.

In addition, the third display electrode may have an aperture or a protrusion.

In addition, each of the first and second display electrodes may has a substantially symmetrical shape with respect to a straight line extending in the first direction.

In addition, the first and second data lines may be disposed at opposite sides of the pixel electrode in the second direction thereof.

In addition, the first and second data lines may be disposed adjacent a same side of the pixel electrode in the second direction thereof.

In addition, an area of the first display electrode may be different from an area of the second display electrode.

According to still other exemplary embodiments of the present invention, there is provided an LCD apparatus including a plurality of pixels each having first and second subpixels, a plurality of gate lines connected to the first and second subpixels to transmit gate signals, and a plurality of data lines intersecting the gate lines and connected to the first subpixels to transmit data voltages, wherein the data voltages applied to the first and second subpixels within each pixel have different magnitudes and the same polarity and are obtained from single image information.

According to further still other exemplary embodiments of the present invention, there is provided an LCD apparatus including a plurality of pixels each having first and second subpixels, a plurality of gate lines connected to the first and second subpixels to transmit gate signals, a plurality of data lines intersecting the gate lines and connected to the first subpixels to transmit data voltages, wherein the data voltages applied to the first and second subpixels have different magnitudes and opposite polarities and are obtained from single image information.

In either of the two above described exemplary embodiments of the present invention, the polarities of data voltages applied to the first and second subpixels may be inverted every row or column of pixels.

In addition, the plurality of data lines may include first and second data lines connected to the first and second subpixels, respectively.

In addition, the first and second data lines for each pixel may be disposed at opposite sides of each pixel. Alternatively, the first and second data lines for each pixel may be disposed at a same side of each pixel. In yet another alternative embodiment, one of the first and second data lines may be disposed between the first and second subpixel electrodes of each pixel.

BRIEF DESCRIPTION OF THE DRAWINGS

The above and other features and advantages of the present invention will become more apparent by describing in detail exemplary embodiments thereof with reference to the attached drawings, in which:

FIGS. 7A and 7B are cross sectional views showing the LCD apparatus taken along lines VIIA-VIIA' and VIIB-VIIB' of FIG. 6 respectively;

DETAILED DESCRIPTION OF THE INVENTION

Figure 1:
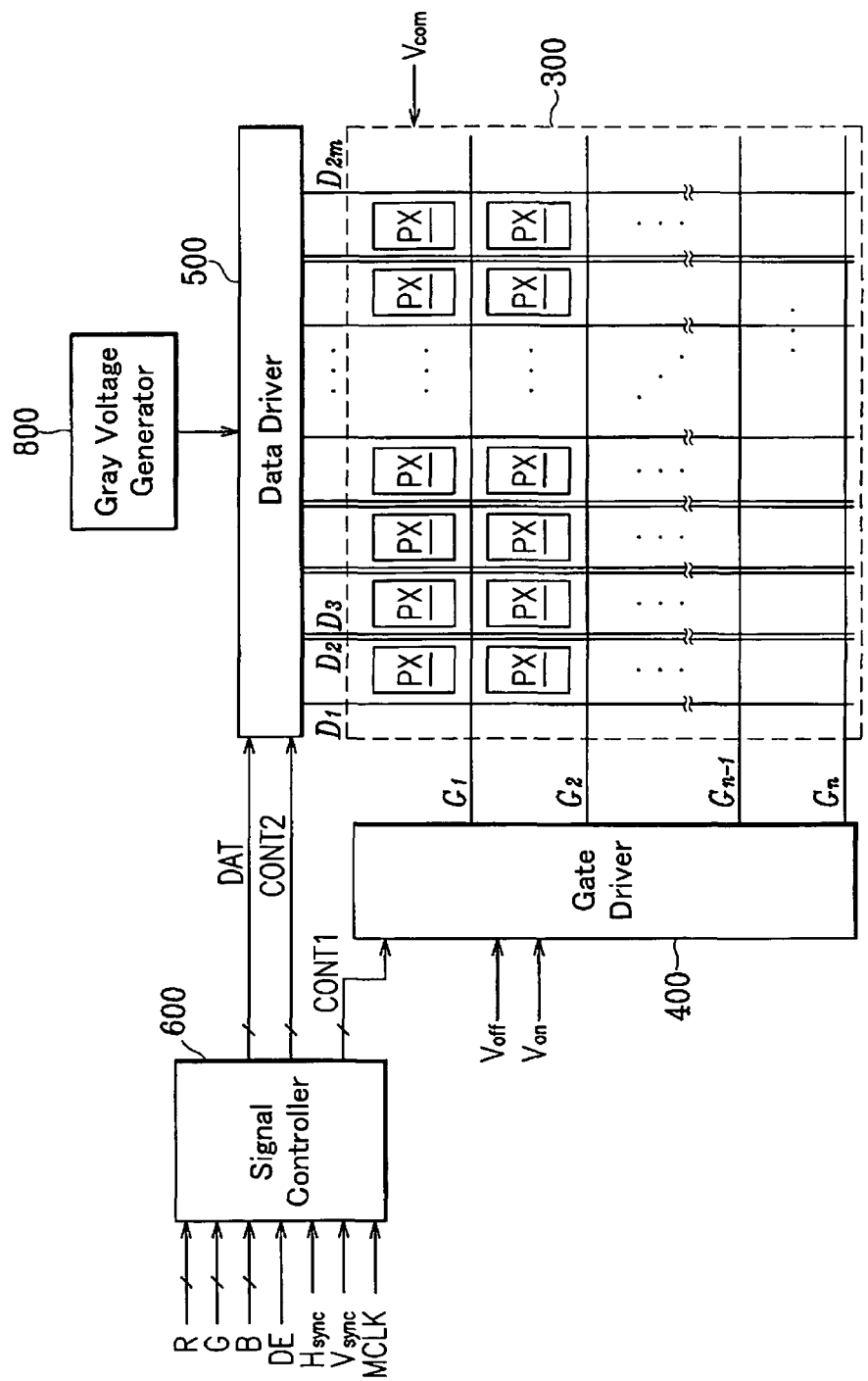
FIG. 1 is a block diagram showing a first exemplary embodiment of an LCD apparatus according to the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in detail with reference to the attached drawings such that the present invention can be easily put into practice by those skilled in the art.

In the drawings, thicknesses are enlarged for the purpose of clearly illustrating layers and areas.

Now, a TFT panel and an LCD apparatus according to the present invention will be described with reference to the accompanying drawings.

Figure 2:
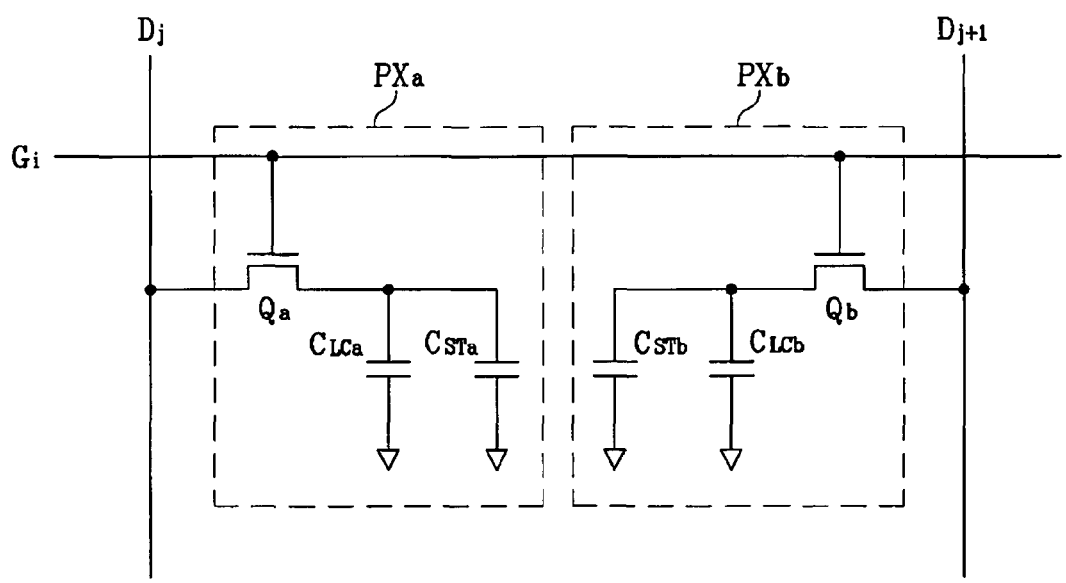
FIG. 2 is an equivalent circuit diagram showing an exemplary pixel of the first exemplary embodiment of the LCD apparatus according to the present invention.
Figure 3:
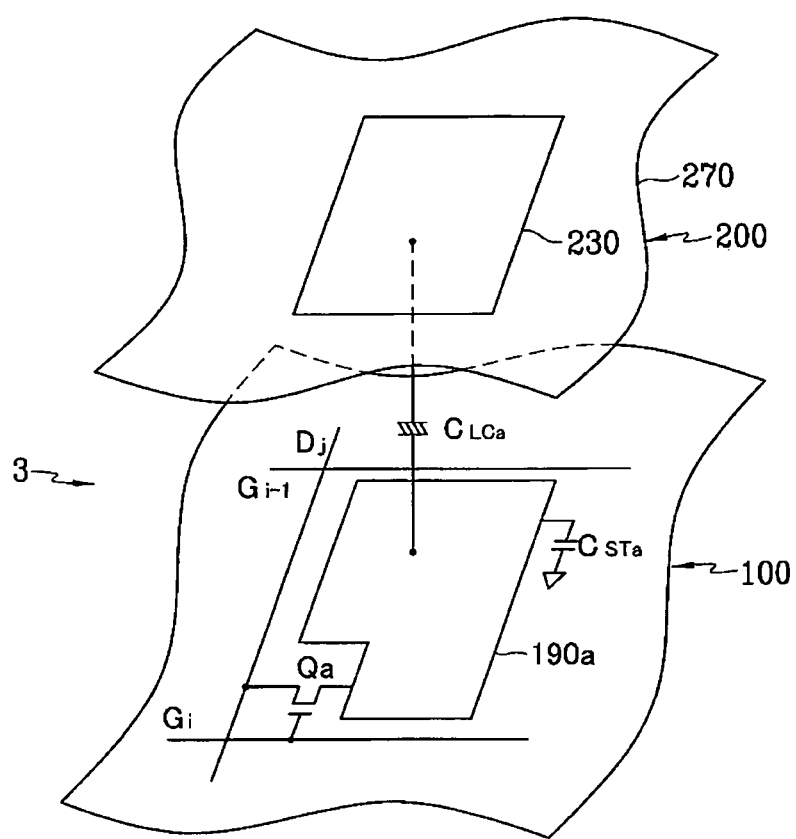
FIG. 3 is an equivalent circuit diagram showing exemplary subpixels of the first exemplary embodiment of the LCD apparatus according to the present invention.

FIG. 1 is a block diagram showing a first exemplary embodiment of an LCD apparatus according to the present invention, FIG. 2 is an equivalent circuit diagram showing an exemplary pixel of the first exemplary embodiment of an LCD apparatus according to the present invention, and FIG. 3 is an equivalent circuit diagram showing an exemplary subpixel of the first exemplary embodiment of an LCD apparatus according to the present invention.

As shown in FIG. 1, the LCD apparatus includes an LCD panel assembly 300, a gate driver 400 and a data driver 500 connected to the LCD panel assembly 300, a grayscale voltage generator 800 connected to the data driver 500, and a signal controller 600 for controlling the components.

As seen in the equivalent circuit diagram of FIG. 3, the LCD panel assembly 300 includes a lower panel 100 as a TFT panel, an upper panel 200 as a common electrode panel, where the panels 100 and 200 face each other, and a liquid crystal layer 3 interposed therebetween. The LCD panel 300 further includes a plurality of pixels PX which are connected to a plurality of signal lines $G_1$ to $G_n$ and $D_1$ to $D_{2m}$ and are arrayed substantially in a matrix on the lower panel 100.

The display signal lines $G_1$ to $G_n$ and $D_1$ to $D_{2m}$ include a plurality of gate lines $G_1$ to $G_n$ for transmitting gate signals (sometimes referred to as "scan signals") and a plurality of data lines $D_1$ to $D_{2m}$ for transmitting data signals. The gate lines $G_1$ to $G_n$ extend substantially parallel to each other substantially in a row direction, and the data lines $D_1$ to $D_{2m}$ extend substantially parallel to each other substantially in a column direction. Therefore, the data lines $D_1$ to $D_{2m}$ extend substantially perpendicular to the gate lines $G_1$ to $G_n$. The data lines $D_1$ to $D_{2m}$ are insulated from the gate lines $G_1$ to $G_n$ as will be further described below.

Each of the data lines $D_1$ to $D_{2m}$ is disposed at one side of one pixel PX. That is, each pixel PX is flanked by a pair of data lines, such that each pixel PX includes two data lines positioned on opposite sides, and two data lines are positioned between each adjacent pair of pixels PX. In addition to the gate lines $G_1$ to $G_n$ and the data lines $D_1$ to $D_{2m}$, the display signal lines may include storage electrode lines, as will be further described below, which extend substantially parallel to the gate lines $G_1$ to $G_n$ within each pixel region.

As shown in FIG. 2, each of the pixels PX includes a pair of subpixels PXa and PXb, and the subpixels PXa and PXb include switching devices Qa and Qb connected to the corresponding gate line $G_i$ and the data lines $D_j$ and $D_{j+1}$, and liquid crystal capacitors $C_{LCa}$ and $C_{LCb}$ and storage capacitors $C_{STa}$ and $C_{STb}$ connected to the switching devices, respectively.

In an alternative embodiment, the storage capacitors $C_{STa}$ and $C_{STb}$ may be omitted.

As shown in FIG. 2, the pair of subpixels PXa and PXb are connected to the same gate line $G_i$, but the subpixels PXa and PXb may be connected to different adjacent data lines $D_j$ and $D_{j+1}$. The subpixel PXa is connected to a data line on a first side of the pixel PX, and the subpixel PXb is connected to a data line on a second side of the pixel PX, opposite the first side.

The TFTs, such as switching devices Qa and Qb, are disposed on the lower panel 100 and are three-port devices. Control and input ports, corresponding to gate and source electrodes, of the switching devices Qa and Qb are connected to the gate lines $G_1$ to $G_n$ and the data lines $D_1$ to $D_{2m}$, and an output port thereof, corresponding to a drain electrode, is connected to the liquid crystal capacitors $C_{LCa}$ and $C_{LCb}$ and the storage capacitors $C_{STa}$ and $C_{STb}$.

As shown in FIG. 3, two of the ports of the liquid crystal capacitor $C_{LCa}$ of the subpixel PXa are a subpixel electrode 190a of the lower panel 100 and a common electrode 270 of the upper panel 200, and the liquid crystal layer 3 interposed between the two electrodes 190a and 270 serves as a dielectric member. The subpixel electrode 190a is connected to the switching device Qa, such as to the output port/drain electrode of the switching device Qa, and the common electrode 270 is disposed in front of the upper panel 200 to receive a common voltage $V_{com}$. Although not illustrated, the common electrode 270 may alternatively be disposed to the lower panel 100, and in this case, at least one of the two electrodes 190a and 270 may be formed in a shape of a line or a bar.

The storage capacitor $C_{STa}$, having an auxiliary function for the liquid crystal capacitor $C_{LCa}$, is constructed by overlapping the subpixel electrode 190a and a separate signal line (not shown) provided to the lower panel 100 with an insulating member interposed therebetween, and a predetermined voltage, such as the common voltage $V_{com}$, is applied to the separate signal line. However, alternatively, the storage capacitor $C_{STa}$ may be constructed by overlapping the subpixel electrode 190a and a front gate line disposed just above with an insulting member interposed therebetween.

In order to implement color display, each of the pixels uniquely displays one color (spatial division), or each of the pixels alternately displays the colors according to time (time division). A desired color can be obtained by a spatial or time combination of the colors, the three colors being red, green, and blue. While an example of a set of the colors includes red, green, and blue colors, it should be understood that alternate color sets may be employed.

FIG. 3 shows an example of spatial division. As shown in the figure, each of the pixels includes a color filter 230 for representing one of the colors, which is provided to a region of the upper panel 200. Each subpixel PXa and PXb may include a color filter. For example, first and second color filters 230 may face the first and second subpixel electrodes 190a and 190b, and the first and second color filters 230 may have the same color.

Alternatively, the color filter 230 may be provided above or under the subpixel electrode 190a of the lower panel 100.

A polarizer (not shown) for polarizing light is attached on at least one of the outer surfaces of the two panels 100 and 200 of the LCD panel assembly 300. For example, first and second polarized films can adjust a transmission direction of light externally provided into the lower panel 100 and the upper panel 200, respectively, in accordance with an aligned direction of the liquid crystal layer 3. The first and second polarized films may have first and second polarized axes thereof substantially perpendicular to each other, respectively.

Returning to FIG. 1, the grayscale voltage generator 800 generates two pairs of grayscale voltages associated with transmittance of the subpixels PXa and PXb. One of the two pairs has a positive value with reference to the common voltage $V_{com}$, and the other has a negative value with reference to the common voltage $V_{com}$.

The gate driver 400 is connected to the gate lines $G_1$ to $G_n$ of the LCD panel assembly 300 to apply gate signals formed in a combination of a gate-on voltage $V_{on}$ to the gate lines $G_1$ to $G_n$.

The data driver 500 is connected to the data lines $D_1$ to $D_{2m}$ of the LCD panel assembly 300 to select grayscale voltages, relating to the luminance of the LCD, from the grayscale voltage generator 800 and to apply the selected grayscale voltages to the subpixels PXa and PXb as data signals. The data driver 500 applies the gray voltages, which are selected for each data line $D_1$ to $D_{2m}$, by control of the signal controller 600, to the data lines $D_1$ to $D_{2m}$ respectively as a data signal.

The gate driver 400 and the data driver 500 may be directly mounted in a form of a plurality of driving integrated circuit ("IC") chips on the LCD panel assembly 300. Alternatively, the gate driver 400 and the data driver 500 may be attached in a form of a tape carrier package ("TCP") on a flexible printed circuit ("FPC") film (not shown) in the LCD panel assembly 300. Alternatively, the gate driver 400 and the data driver 500 may be directly mounted on the LCD panel assembly 300.

The signal controller 600 controls operations of the gate driver 400, the data driver 500, and the like.

Now, a structure of the LCD apparatus will be further described with reference to FIGS. 4 to 7B.

Figure 4:
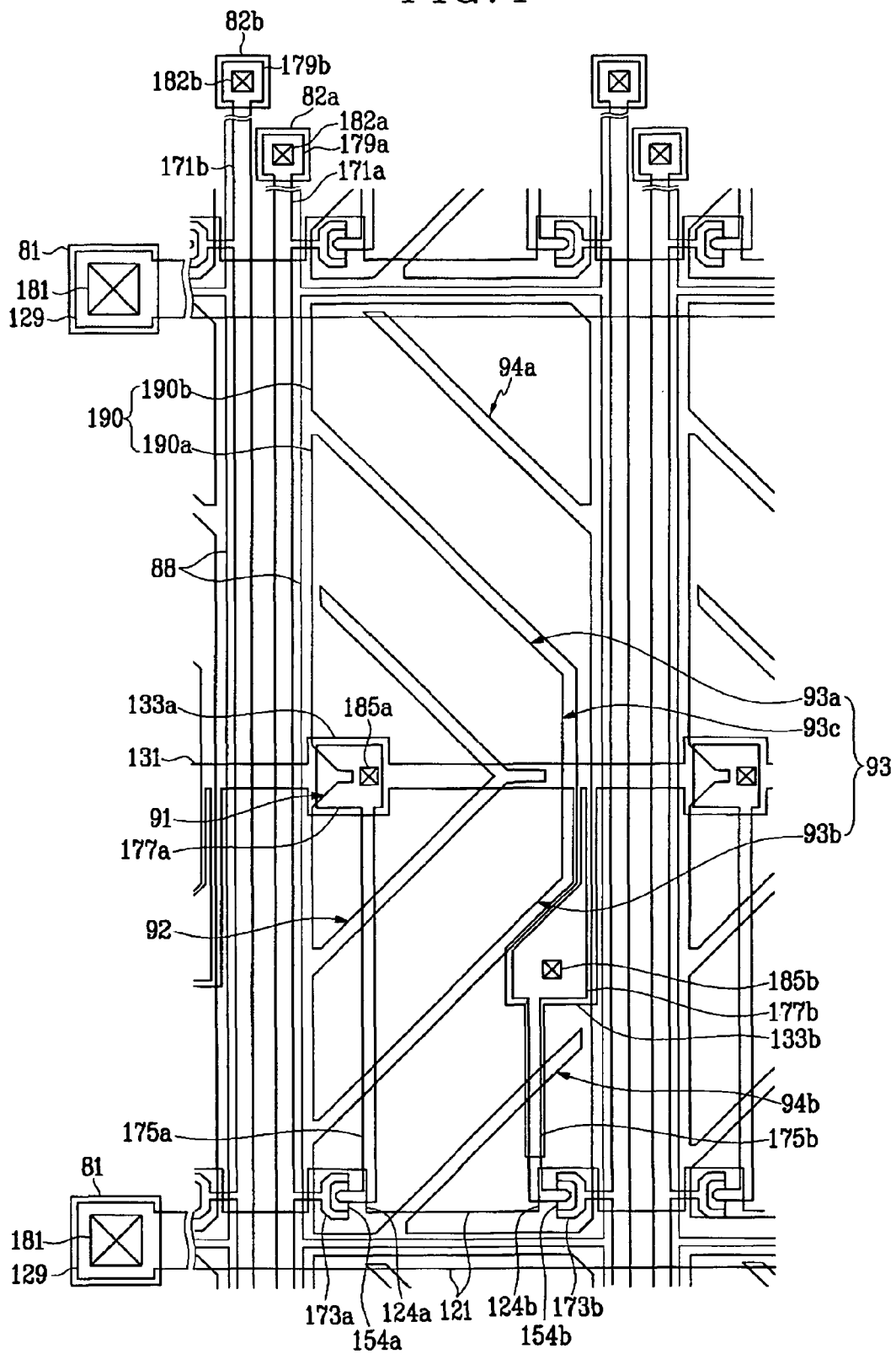
FIG. 4 is a view showing a layout of an exemplary TFT panel for the first exemplary embodiment of the LCD apparatus according to the present invention.
Figure 5:
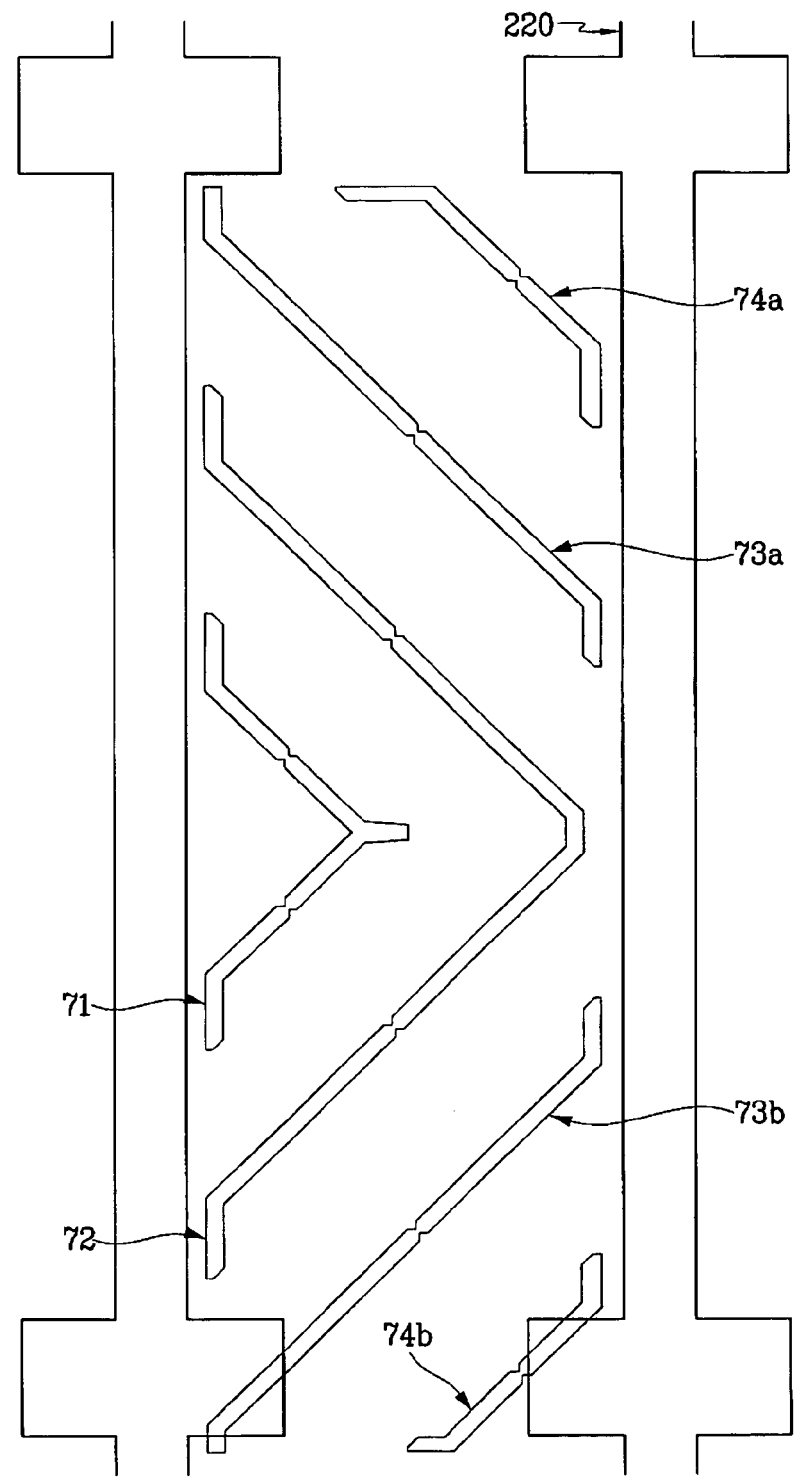
FIG. 5 is a view showing a layout of an exemplary common electrode panel for the first exemplary embodiment of the LCD apparatus according to the present invention.
Figure 6:
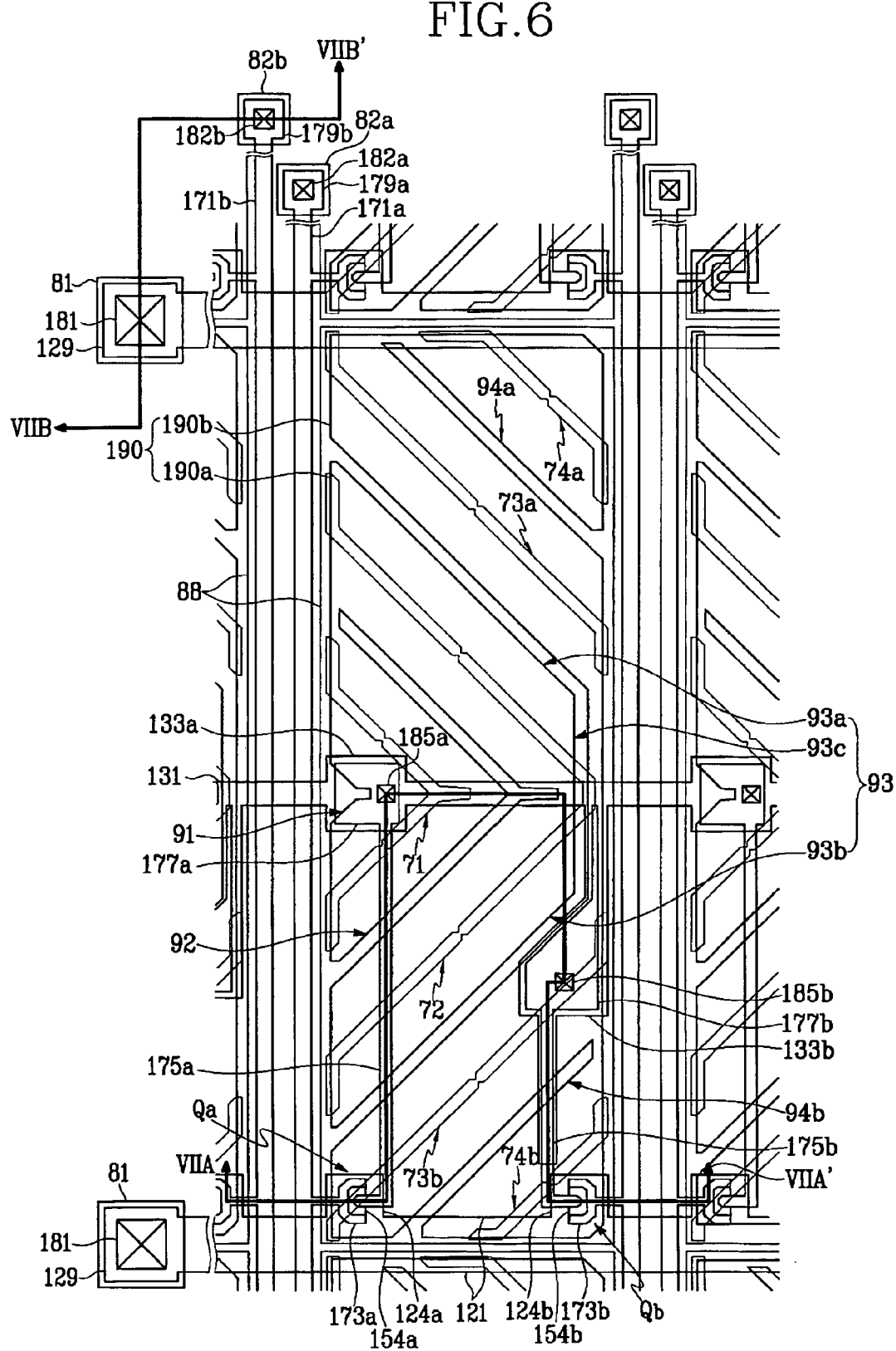
FIG. 6 is a view showing a layout of the first exemplary embodiment of an LCD apparatus constructed with the exemplary TFT panel of FIG. 4 and the exemplary common electrode panel of FIG. 5.
Figure 7B:
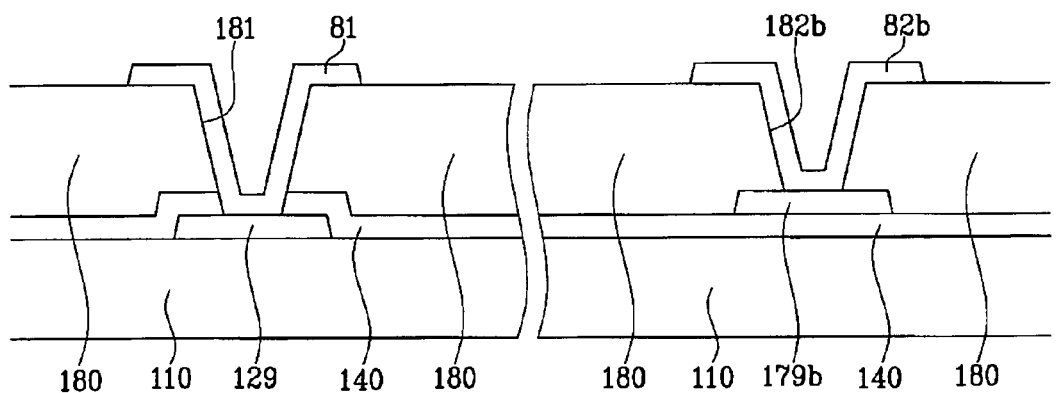

FIG. 4 is a view showing a layout of an exemplary TFT panel for the first exemplary embodiment of an LCD apparatus according to the present invention, FIG. 5 is a view showing a layout of an exemplary common electrode panel for the first exemplary embodiment of an LCD apparatus according to the present invention, and FIG. 6 is a view showing a layout of the first exemplary embodiment of an LCD apparatus constructed with the exemplary TFT panel of FIG. 4 and the exemplary common electrode panel of FIG. 5. FIGS. 7A and 7B are cross sectional views showing the LCD apparatus taken along lines VIIA-VIIA' and VIIB-VIIB' of FIG. 6, respectively.

The LCD apparatus includes a TFT panel 100 and a common electrode panel 200 which face each other and a liquid crystal layer 3 interposed between the two panels 100 and 200.

First, the TFT panel 100 will be described with reference to FIGS. 4, 6, 7A, and 7B.

A plurality of gate lines 121 and a plurality of storage electrode lines 131 are disposed on a dielectric substrate 110 made of a transparent glass or the like, such as other transparent insulating materials.

The gate lines 121 mainly extend in a first direction, such as a longitudinal direction, are separated from each other and transmit gate signals. Each of the gate lines 121 includes a plurality of protrusions constituting a plurality of gate electrodes 124a and 124b and an end portion 129 having a wide area for connection to other layers or external apparatuses. The gate electrodes 124a and 124b may be spaced apart such that the gate electrode 124a is positioned adjacent a first side of the pixel PX and the gate electrode 124b is positioned adjacent a second side of the pixel PX. However, the gate electrodes 124a and 124b may be positioned differently than illustrated.

The storage electrode lines 131 extend mainly in the first direction, such as the longitudinal direction substantially parallel to the gate lines 121, and include a plurality of protrusions constituting storage electrodes 133a and 133b.

The storage electrode 133a is in a shape of a rectangle and has symmetry about the storage electrode line 131, and the storage electrode 133b extends in a transverse direction protruding from the storage electrode line 131, and has an extension portion which further extends therefrom. In other words, the storage electrode 133b is positioned between the storage electrode line 131 and the gate line 121, with an extension portion extending further towards the gate line 121.

A predetermined voltage, such as a common voltage Vcom applied to the common electrode 270 of the common electrode panel 200 of the LCD apparatus, is also applied to the storage electrode line 131.

The gate lines 121 and the storage electrode lines 131 may be made of an aluminum based metal such as, but not limited to, aluminum (Al) and an aluminum alloy, a silver based metal such as silver (Ag) and a silver alloy, a copper based metal such as copper (Cu) and a copper alloy, a molybdenum based metal such as molybdenum (Mo) and a molybdenum alloy, chromium (Cr), titanium (Ti), or tantalum (Ta).

Alternatively, the gate lines 121 and the storage electrode lines 131 may have a multi-layered structure including two conductive layers (not shown) having different physical properties. In such a case, one of the two conductive layers would be made of a metal having a low resistivity, for example, an aluminum based metal, a silver based metal, or a copper based metal, in order to reduce signal delay or voltage drop of the gate lines 121 and the storage electrode lines 131, and the other conductive layer would be made of a material having good contactness to other materials, particularly, to indium tin oxide ("ITO") and indium zinc oxide ("IZO"), such as a molybdenum based metal, chromium, titanium, and tantalum.

As a preferred example of the combination, of the multi-layered structure may include a lower chromium layer and an upper aluminum layer and a lower aluminum layer and an upper molybdenum layer.

However, while particular examples have been described, it should be understood that the gate lines 121 and the storage electrode lines 131 may be made of various metals and conductive materials.

In addition, side surfaces of the gate lines 121 and the storage electrode lines 131 are inclined with respect to a surface of the substrate 110, and it is preferable that the slanted angle is in a range of about 30° to about 80°.

A gate insulating layer 140 made of a silicon nitride $SiN_x$ or the like is formed on the gate lines 121 and the storage electrode lines 131, and may be further formed on the exposed portions of the substrate 110 not covered by the gate lines 121 or the storage electrode lines 131.

A plurality of line-shaped semiconductors 151a and 151b made of hydrogenated amorphous silicon ("a-Si") are formed on the gate insulating layer 140. The line-shaped semiconductors 151a and 151b extend mainly in a second direction, such as a transverse direction substantially perpendicular to the first direction, and a plurality of protrusions 154a and 154b extend toward the gate electrodes 124a and 124b and overlap the gate electrodes 124a and 124b.

A plurality of line-shaped and island-shaped ohmic contact members 161a, 161b, 165a, and 165b made of a silicide or n+ hydrogenated a-Si, or the like, which are doped with n type impurities such as phosphorus (P), are formed on the line-shaped semiconductors 151a and 151b. The line-shaped ohmic contact members 161a and 161b have a plurality of protrusions 163a and 163b, respectively, and the protrusions 163a and 163b and the island-shaped ohmic contact members 165a and 165b constitute respective pairs and are disposed on the protrusions 154a and 154b of the line-shaped semiconductors 151a and 151b. In other words, the protrusions 163a and island-shaped ohmic contact members 165a are positioned in spaced locations on the protrusions 154a, and the protrusions 163b and island-shaped ohmic contact members 165b are positioned in spaced locations on the protrusions 154b.

Side surfaces of the semiconductors 151a and 151b and the ohmic contact members 161a, 161b, 163a, 163b, 165a, and 165b are also slanted with respect to the surface of the substrate 110, and the slanted angle is in a range of about 30° to about 80°.

A plurality of data lines 171a and 171b and a plurality of drain electrodes 175a and 175b, which are separated from the plurality of data lines 171a and 171b, are formed on the ohmic contact members 161a, 161b, 165a, and 165b, respectively.

The data lines 171a and 171b extend mainly in the second direction, such as the transverse direction, to substantially perpendicularly intersect the gate lines 121 and the storage electrode lines 131 and apply the data voltages. The data lines 171a and 171b have a plurality of source electrodes 173a and 173b, which overlap the protrusions 163a and 163b of the line-shaped ohmic contact members 161a and 161b and extend toward the drain electrodes 175a and 175b, and end portions 179a and 179b, which have enlarged widths for connection to other layers or external apparatuses.

The drain electrodes 175a and 175b extend mainly in the transverse direction, parallel to the data lines 171a and 171b, and have enlarged portions 177a and 177b that overlap with the storage electrodes 133a and 133b. The sides of the enlarged portions 177a and 177b of the drain electrodes 175a and 175b are substantially parallel to the sides of the storage electrodes 133a and 133b. The gate electrodes 124a and 124b, the source electrodes 173a and 173b, and the drain electrodes 175a and 175b, together with the semiconductors 154a and 154b, constitute the TFTs Qa and Qb, respectively. Channels of the TFTs Qa and Qb are formed on the semiconductors 154a and 154b between the source electrodes 173a and 173b and the drain electrodes 175a and 175b, respectively, and between the protrusions 163a and 163b and the island-shaped ohmic contact members 165a and 165b.

The data lines 171a and 171b and the drain electrodes 175a and 175b are preferably made of chromium (Cr), a molybdenum (Mo) based metal, or a refractory metal such as tantalum (Ta) and titanium (Ti), and may have a multi-layered structure which is constructed with a lower layer (not shown) made of the refractory metal and an upper layer (not shown) made of a low resistance material disposed thereon.

As an example of the multi-layered structure, in addition to the aforementioned two-layered structure of a lower chromium or molybdenum layer and an upper aluminum layer, there may be a three-layered structure of a molybdenum layer/an aluminum layer/a molybdenum layer. In this structure, an interval between two adjacent data lines 171a and 171b is maintained at a minimum interval by taking into consideration production capability and yield, so that a decrease in aspect ratio involved with an increase in the number of data lines 171a and 171b can be minimized.

Similar to the gate lines 121 and the storage electrode lines 131, the side surfaces of the data lines 171a and 171b and the drain electrodes 175a and 175b are slanted with respect to the substrate 110 at an angle ranging from about 30° to about 80°.

The ohmic contact members 161a, 161b, 163a, 163b, 165a, and 165b are interposed only between the underlying line-shaped semiconductors 151a and 151b and protrusions 154a and 154b and the overlying data lines 171a and 171b, source electrodes 173a and 173b, and drain electrodes 175a and 175b, and have a function of reducing contact resistance. The line-shaped semiconductors 151a and 151b and protrusions 154a and 154b have a shape which is substantially equal to or underlying the shapes of the data lines 171a and 171b, the source electrodes 173a and 173b, the drain electrodes 175a and 175b, and the ohmic contact members 161a, 161b, 163a, 163b, 165a, and 165b. However, the line-shaped semiconductors 151a and 151b have exposed portions uncovered between the source electrodes 173a and 173b and the drain electrodes 175a and 175b and between the protrusions 163a and 163b and the island shaped ohmic contact members 165a and 165b.

A protective film (passivation layer) 180 is formed on the data lines 171a and 171b, the source electrodes 173a and 173b, the drain electrodes 175a and 175b, and the exposed protrusions 154a and 154b of the semiconductors 151a and 151b. The protective film 180 is made of an inorganic material such as a silicon nitride and a silicon oxide, an organic material having an excellent planarization property and photosensitivity, and a low dielectric-constant insulating material formed by plasma enhanced chemical vapor deposition ("PECVD"), such as a-Si:C:O and a-Si:O:F. However, in order to use the excellent properties of an organic film and to protect the exposed portions of the protrusions 154a and 154b of the semiconductors 151a and 151b, the protective film 180 may have a two-layered structure including a lower inorganic film and an upper organic film.

In the protective film 180, a plurality of contact holes 185a, 185b, 182a, and 182b which expose the enlarged portions 177a and 177b of the drain electrodes 175a and 175b and the end portions 179a and 179b of the data lines 171a and 171b are formed. Also, a plurality of contact holes 181 which expose the end portions 129 of the gate lines 121 are formed in the protective film 180 and the gate insulating layer 140.

On the protective film 180, a plurality of pixel electrodes 190 including the first and second subpixel electrodes 190a and 190b, a plurality of shielding electrodes 88, and a plurality of contact assistant members 81, 82a, and 82b are formed. The pixel electrodes 190, the shielding electrodes 88, and the contact assistant members 81, 82a, and 82b are made of a transparent conductive material such as ITO and IZO or a reflective conductive material such as aluminum.

The first and second subpixel electrodes 190a and 190b are physically and electrically connected through the contact holes 185a and 185b to the drain electrodes 175a and 175b to receive data voltages from the drain electrodes 175a and 175b. Different data voltages predetermined with respect to a single input image signal are applied to the pair of the subpixel electrodes 190a and 190b, and the magnitude of the data voltages may be determined according to the sizes and shapes of the subpixel electrodes 190a and 190b. The subpixel electrodes 190a and 190b may have different areas, for example, the subpixel electrode 190a may have a shape which is nested within, yet slightly spaced from, the shape of the subpixel electrode 190b, as will be further described below.

The subpixel electrodes 190a and 190b applied with the data voltages, together with the common electrode 270, generate electric fields, so that alignment of the liquid crystal molecules of the liquid crystal layer 3 between the two subpixel electrodes 190a/190b and the common electrode 270 can be determined.

The first and second subpixel electrodes 190a and 190b and the common electrode 270 constitute capacitors (hereinafter, referred to as "liquid crystal capacitors") $C_{LCa}$ and $C_{LCb}$ to sustain the applied voltages although the TFTs Qa and Qb turn off. In order to increase the voltage storage capability, other capacitors connected in parallel to the liquid crystal capacitors $C_{LCa}$ and $C_{LCb}$ are provided, and the capacitors are called storage capacitors $C_{STa}$ and $C_{STb}$. The storage capacitors $C_{STa}$ and $C_{STb}$ are constructed by overlapping the first and second subpixel electrodes 190a and 190b and the storage electrode line 131. In order to increase electric capacitance of the storage capacitors $C_{STa}$ and $C_{STb}$, that is, storage capacitance, storage electrodes 133a and 133b are provided to the storage electrode line 131 and overlapped with the enlarged portions 177a and 177b of the drain electrodes 175a and 175b connected to the first and second subpixel electrodes 190a and 190b through the first and second contact holes 185a and 185b, so that the distance between ports is reduced and the overlapped area is enlarged.

The upper right corner of each pixel electrode 190, corresponding to sub pixel electrode 190b, is cut, and the cut side has an angle of about 45° with respect to the gate line 121.

The pair of first and second subpixel electrodes 190a and 190b, constituting one pixel electrode 190, is engaged with each other with a gap 93 interposed therebetween, and an outer boundary of the pixel electrode 190 has a shape of an approximate rectangle. The first subpixel electrode 190a has a shape of a rotated equilateral trapezoid which has a left side close to the storage electrode 133a and extending substantially parallel to the data line 171a, a right side opposite thereto and extending substantially parallel to the data line 171b, and upper and lower slanted sides having an angle of about 45° with respect to the gate lines 121. The upper and lower slanted sides of the first subpixel electrode 190a may be substantially perpendicular to each other. The second subpixel electrode 190b has a pair of trapezoidal portions facing the slanted sides of the first subpixel electrode 190a and a transverse portion facing the right side of the first subpixel electrode 190a. In addition, the gap 93 includes upper and lower slanted portions 93a and 93b, having substantially uniform widths and an angle of about 45° with respect to the gate lines 121, and a transverse portion 93c also having a substantially uniform width. The transverse portion 93c includes a first end and a second end, where the upper slanted portion 93a extends from the first end of the transverse portion 93c and the lower slanted portion 93b extends from the second end of the transverse portion 93c. Hereinafter, for convenience of the description, the gap 93 is denoted as an aperture.

The pixel electrode 190 has central apertures 91 and 92, upper apertures 93a and 94a, and lower apertures 93b and 94b, and the pixel electrode 190 is divided into a plurality of regions by the apertures 91, 92, 93a, 93b, 94a, and 94b, where the apertures 93a and 93b correspond to the upper slanted portion and lower slanted portion separating the subpixel electrodes 190a and 190b. The apertures 91, 92, 93a, 93b, 94a, and 94b have an approximate inversion symmetry with respect to the storage electrode line 131. That is, the upper apertures positioned on a first side of the storage electrode line 131 may be substantially mirror images of the lower apertures positioned on a second side of the storage electrode line 131.

The upper and lower apertures 93a, 93b, 94a, and 94b extend in a slanted direction from the left side of the pixel electrodes 190 to the right side thereof and are disposed in upper and lower half regions with respect to the storage electrode line 131 which bisects the pixel electrode 190 in a longitudinal direction, respectively. The upper and lower apertures 93a, 93b, 94a, and 94b have an angle of about 45° with respect to the gate lines 121 and the upper apertures 93a and 94a extend perpendicular to the lower apertures 93b and 94b, and the central apertures 91 and 92 have a pair of branches which are substantially parallel to the upper apertures 93a and 94a and lower apertures 93b and 94b. The central apertures 91 and 92 also have longitudinal portions extending in a longitudinal direction at the center thereof, such as along the storage electrode line 131.

Accordingly, each of the upper and lower half regions of the pixel electrodes 190 is divided into four regions by the apertures 91, 92, 93a, 93b, 94a, and 94b. Here, the number of regions or the number of apertures may vary according to a size of the pixel PX, an aspect ratio of the pixel electrodes 190, a type or characteristics of the liquid crystal layer 3, or other design factors.

The pixel electrode 190 overlaps with adjacent gate lines 121, so that an aperture ratio thereof increases.

The shielding electrodes 88 extend along the data lines 171a and 171b and the gate lines 121. Portions thereof disposed over the data lines 171a and 171b entirely cover the data lines 171a and 171b, and portions thereof disposed over the gate lines 121 have a width smaller than widths of the gate lines 121 and are disposed within boundaries of the gate lines 121. The two data lines 171a and 171b disposed between two adjacent pixel electrodes 190 are entirely covered with the shielding electrodes 88. Alternatively, the widths of the shielding electrodes 88 may be adjusted to be smaller than the combined widths of the data lines 171a and 171b, and/or boundary lines of the shielding electrodes 88 may be located outside the boundaries of the gate lines 121. In order to apply a common voltage Vcom to the shielding electrodes 88, the shielding electrodes 88 may be connected through contact holes (not shown) within the protective film 180 and the gate insulating layer 140 to the storage electrode line 131 or a short point (not shown) through which the common voltage Vcom is transmitted from the TFT panel 100 to the common electrode panel 200. Here, it is preferable that a distance between the shielding electrode 88 and the pixel electrode 190 is designed to be minimized in order to minimize the decrease in the aperture ratio.

In such an arrangement, if the shielding electrodes 88 applied with the common voltage Vcom are disposed over the data lines 171a and 171b, the shielding electrodes 88 shield the electric field generated between the data lines 171a and 171b and the pixel electrodes 190 and between the data lines 171a and 171b and the common electrode 270, so that voltage distortion of the pixel electrodes 190 and signal delay and distortion of data voltage transmitted by the data lines 171a and 171b can be reduced.

In addition, since the pixel electrodes 190 and the shielding electrodes 88 are separated from each other by a distance in order to prevent a short-circuit therebetween, the pixel electrodes 190 can be further separated from the data lines 171a and 171b, so that parasite capacitance therebetween can be reduced. In addition, since permittivity of the liquid crystal layer 3 is higher than that of the protective film 180, the parasite capacitance between the data lines 171a and 171b and the shielding electrodes 88 is lower than the parasite capacitance between the data lines 171a and 171b and common electrode 270 in a case where the shielding electrodes 88 are not provided.

In addition, since the pixel electrodes 190 and the shielding electrodes 88 are constructed with the same layer, the distance therebetween can be uniformly maintained, so that the parasite capacitance therebetween is uniform.

The contact assistant members 81, 82a, and 82b are connected through the contact holes 181, 182a, and 182b to the end portions 129 of the gate lines 121 and the end portions 179a and 179b of the data lines 171a and 171b, respectively. The contact assistant members 81, 82a, and 82b have a function of compensating for adhesiveness of the exposed end portions 129 of the gate lines 121 and the exposed end portions 179a and 179b of the data lines 171a and 171b to external apparatuses, and of protecting these portions.

When the gate driver 400 or the data driver 500 shown in FIG. 1 is integrated in the TFT panel 100, the gate lines 121 or the data lines 171a and 171b extend to be directly connected to the drivers. In this case, the contact assistant members 81, 82a, and 82b may be used to connect the gate lines 121 and the data lines 171a and 171b to the drivers 400 and 500, respectively.

On the pixel electrodes 190, the contact assistant members 81, 82a, and 82b, and the protective film 180, an alignment film 11 for aligning the liquid crystal layer 3 is coated. The alignment film 11 may be a vertical alignment film.

Next, the common electrode panel 200 will be described with reference to FIGS. 5 to 7A.

A light-shielding member 220 for preventing light leakage, also termed a black matrix, is formed on a dielectric substrate 210 made of a transparent glass or the like, such as other transparent insulating materials.

The light-shielding member 220 includes a plurality of opening portions which face the pixel electrodes 190 and have substantially the same shape as the pixel electrodes 190. Alternatively, the light-shielding member 220 may be constructed with portions corresponding to the data lines 171a and 171b and portions corresponding to the TFTs Qa and Qb. However, the light-shielding member 220 may have various shapes in order to shield the light leakage in a vicinity of the pixel electrodes 190 and the TFTs Qa and Qb.

A plurality of color filters 230 are formed on the substrate 210. The color filters 230 are disposed in most regions surrounded by the light-shielding member 220 and extend along the pixel electrodes 190 in the transverse direction.

The color filters 230 can display one of the colors, i.e., red, green, or blue, or other colors not otherwise described herein.

A cover film 250 is formed on the color filters 230 and the light-shielding member 220 in order to prevent the color filters 230 from being exposed and to provide a planarized surface.

A common electrode 270 made of a transparent conductive material such as, but not limited to, ITO and IZO is formed on the cover film 250.

The common electrode 270 includes a plurality of apertures 71 to 74b as shown in FIGS. 5 and 6.

The apertures 71 to 74b face one of the pixel electrodes 190 and include central apertures 71 and 72, upper apertures 73a and 74a, and lower apertures 73b and 74b. The apertures 71 to 74b are disposed between the adjacent apertures 91 to 94b of the pixel electrode 190 and between the apertures 94a and 94b and the sides of the pixel electrode 190. In addition, each of the apertures 71 to 74b includes at least one slanted portion which extends in parallel to the apertures 91 to 94a of the pixel electrodes 190.

Each of the upper and lower apertures 73a to 74b includes a slanted portion which extends from a portion of the common electrode 270 corresponding to the right side of each pixel electrode 190 toward lower or upper sides thereof and longitudinal and/or transverse portions which extend from the ends of the slanted portion along portions of the common electrode 270 corresponding to the sides of the pixel electrode 190 with an obtuse angle with the slanted portion and overlap with the portions of the common electrode 270 corresponding to sides of the pixel electrode 190.

The central aperture 71 includes a central longitudinal portion which extends from the left side in the longitudinal direction, a pair of slanted portions which extend from the central longitudinal portion toward portions of the common electrode 270 corresponding to the left sides of the pixel electrode 190 with a slanted angle with respect to the central longitudinal portion, and distal transverse portions which extend from the ends of the slanted portions along portions of the common electrode 270 corresponding to the left side of the pixel electrode 190 with an obtuse angle with the slanted portions and overlap with portions of the common electrode 270 corresponding to the left side of the pixel electrode 190. The central aperture 72 includes a transverse portion which extends along portions of the common electrode 270 corresponding to the right side of the pixel electrode 190 and overlaps with portions of the common electrode 270 corresponding to the right side of the pixel electrode 190, a pair of slanted portions which extend from the ends of the transverse portion toward portions of the common electrode 270 corresponding to the left side of the pixel electrode 190, and distal transverse portions which extend from the ends of the slanted portions along portions of the common electrode 270 corresponding to the left side of the pixel electrode 190 with an obtuse angle with the slanted portions and overlap with portions of the common electrode 270 corresponding to the left side of the pixel electrode 190. As the common electrode 270 may cover substantially an entire surface of the common electrode panel 200, the pattern of apertures 71 to 74b described herein may be repeated for each pixel region of the TFT panel 100.

Notches having a shape of a triangle are formed in the slanted portions of the apertures 71 to 74b. Alternatively, the notches may have a shape of a rectangle, a trapezoid, or a semicircle, and may have a convex or a concave shape. Due to the notches, an alignment direction of the liquid crystal molecules within the liquid crystal layer 3 located within boundaries corresponding to the apertures 71 to 74b can be determined.

The number of apertures 71 to 74b may vary according to the design factors, and the light-shielding member 220 may overlap with the apertures 71 to 74b to shield the light leakage in a vicinity of the apertures 71 to 74b Since the same common voltage Vcom is applied to the common electrode 270 and the shielding electrodes 88, no electric field is generated therebetween. Accordingly, the liquid crystal molecules within the liquid crystal layer 3 disposed between the common electrode 270 and the shielding electrodes 88 maintain an initial vertically aligned state, and light incident to the region cannot transmit.

At least one of the apertures 91 to 94b and 71 to 74b may be replaced with protrusions or recessed portions, and, although a particular shape and arrangement of the apertures 91 to 94b and 71 to 74b has been described for exemplary purposes, the shape and arrangement of the apertures 91 to 94b and 71 to 74b may be modified in alternative embodiments.

On the common electrode 270 and the cover film 250, an alignment film 21 for aligning the liquid crystal layer 3 is coated. The alignment film 21 may be a vertical alignment film.

Polarizing plates 12 and 22 are provided on outer surfaces of the panels 100 and 200. Transmitting axes of the two polarizing plates 12 and 22 are perpendicular to each other, and one of the transmitting axes (or absorbing axes) is parallel to the longitudinal direction. In the case of a reflective type LCD apparatus, one of the two polarizing plates 12 and 22 may be omitted.

The liquid crystal layer 3 has a negative anisotropic permittivity, and the liquid crystal molecules of the liquid crystal layer 3 are aligned so as for major axes thereof to be perpendicular to the surfaces of the two panels 100, 200 when no electric field is applied to the liquid crystal molecules.

When the common voltage Vcom and the data voltage are applied to the common electrode 270 and the pixel electrodes 190, respectively, an electric field is generated in a direction substantially perpendicular to the surfaces of the panels 100 and 200. The apertures 91 to 94b and 71 to 74b of the electrodes 190 and 270 distort the electric field to generate a horizontal component which is perpendicular to the sides of the apertures 91 to 94b and 71 to 74b.

Accordingly, the electric field is oriented in a direction slanted with respect to a direction perpendicular to the surfaces of the panels 100 and 200.

In response to the electric field, the liquid crystal molecules within the liquid crystal layer 3 have a tendency to change the major axis direction to be perpendicular to the direction of the electric field. At this time, since the electric field in a vicinity of the apertures 91 to 94a and 71 to 74b and the sides of the pixel electrode 190 has a predetermined angle which is not parallel to the major axis direction of the liquid crystal molecules, the liquid crystal molecules rotate in such a direction that the moving distance on the surface formed by the major axis direction of the liquid crystal molecules and the electric field is short. Therefore, one group of the apertures 91 to 94b and 71 to 74b and the sides of the pixel electrode 190 divide the region of the liquid crystal layer 3 located on the pixel electrode 190 into a plurality of domains where the liquid crystal molecules have different tilted angles, so that it is possible to increase a reference viewing angle.

Now, operations of the LCD apparatus will be further described.

As shown in FIG. 1, the signal controller 600 receives red, green, and blue input image signals R, G, and B and input control signals for controlling a display thereof from an external graphic controller (not shown). Examples of the input control signals include a vertical synchronization signal Vsync, a horizontal synchronization signal Hsync, a main clock MCLK, and a data enable signal DE. The signal controller 600 suitably processes the input image signals R, G, and B based on the input control signals and the input image signals R, G, and B according to an operating condition of the LCD panel assembly 300 to generate a gate control signal CONT1 and a data control signal CONT2, and subsequently transmits the generated gate control signal CONT1 to the gate driver 400 and the generated data control signal CONT2 and the processed image signals DAT to the data driver 500. Here, the conversion of the image signals is performed through mapping stored in a lookup table (not shown) which is determined in advance by experiments or the like or through a calculation of the signal controller 600.

The gate control signal CONT1 includes a scan start signal STV, which is a vertical synchronizing start signal, for indicating a scan start of a gate-on voltage $V_{on}$ and at least one gate clock signal CPV for controlling an output time of the gate-on voltage $V_{on}$. An output enable signal OE may further define the duration of the gate-on voltage $V_{on}$.

The data control signal CONT2 includes a horizontal synchronization start signal STH indicating data transmission for a row of subpixels PXa and PXb, a load signal LOAD for commanding to apply the associated data voltages to the data lines $D_1$ to $D_{2m}$, and a data clock signal HCLK. The data control signal CONT2 may further include an inverse signal RVS for inverting/reversing a polarity of the data voltage with respect to the common voltage $V_{com}$ (hereinafter, "the polarity of the data voltage with respect to the common voltage $V_{com}$" being abbreviated to "data signal polarity").

In response to the data control signal CONT2 from the signal controller 600, the data driver 500 sequentially receives and shifts image data DAT for a row of the subpixels PXa and PXb, selects the grayscale voltage corresponding to each of the image data DAT among the grayscale voltages from the grayscale voltage generator 800 to convert the image data DAT to the associated analog data voltages, and subsequently applies the data voltages to the data lines $D_1$ to $D_{2m}$.

In response to the gate control signal CONT1 from the signal controller 600, the gate driver 400 sequentially applies the gate-on voltage $V_{on}$ to the gate lines $G_1$ to $G_n$ to turn on the switching devices Qa and Qb via the gate electrodes connected to the gate lines $G_1$ to $G_n$. As a result, the data voltages applied to the data lines $D_1$ to $D_{2m}$ are applied to the associated subpixels PXa and PXb through the drain electrodes of the turned-on switching devices Qa and Qb, which receive the data voltages through the source electrodes.

Differences between the data voltages applied to the subpixels PXa and PXb and the common voltage $V_{com}$ become charge voltages of the liquid crystal capacitors $C_{LCa}$ $C_{LCb}$, that is, subpixel voltages. Alignment of the liquid crystal molecules varies according to the intensities of the subpixel voltages. Therefore, polarization of light passing through the liquid crystal layer 3 changes. The change in the polarization results in a change in transmittance of the light due to the polarizing plates 12 and 22 attached to the panels 100 and 200.

One input image data is converted to a pair of output image data, and the output data provide different transmittance to a pair of subpixels PXa and PXb. The two subpixels PXa and PXb show different gamma curves, and a gamma curve of one pixel PX is a combination of the gamma curves.

When one horizontal period (or 1H, that is, one period of the horizontal synchronization signal Hsync and the data enable signal DE) elapses, the data driver 500 and the gate driver 400 repeatedly perform the aforementioned operation for the next row of subpixels PXa and PXb. In this manner, during one frame, the gate-on voltage $V_{on}$ is sequentially applied to all the gate lines $G_1$-$G_n$, so that the data voltage is applied to all the subpixels PXa and PXb. When one frame ends, the next frame starts, and a state of the inverse signal RVS, part of the data control signals CONT2, applied to the data driver 500 is controlled, so that the polarity of data voltage applied to each of the subpixels PXa and PXb is opposite to the polarity in the previous frame ("frame inversion"). Alternatively, even within one frame, according to the characteristics of the inverse signals RVS, the polarities of the data voltage flowing through the data lines may be inverted (row inversion and point inversion).

Now, a polarity and an inversion scheme of the exemplary pixel electrode of the first exemplary embodiment of the LCD apparatus according to the present invention will be described with reference to FIGS. 8A and 8B.

Figure 8A:
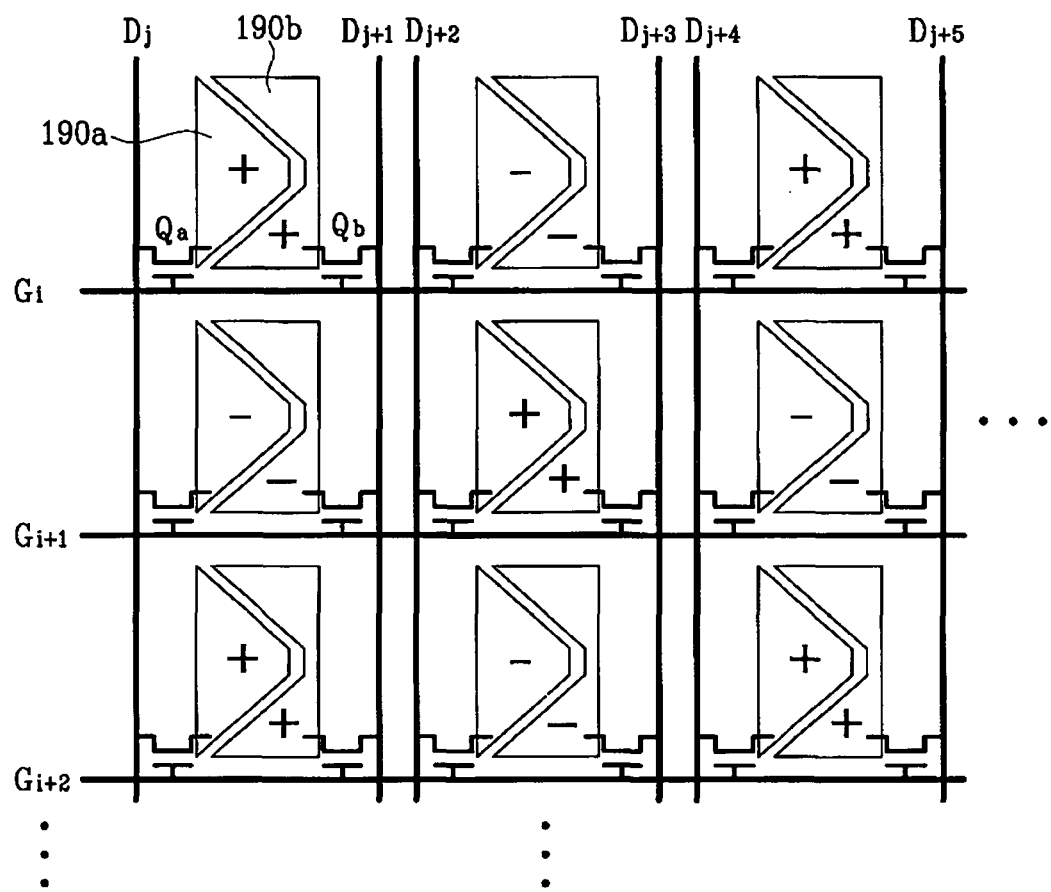
FIGS. 8A and 8B are views showing a polarity state of the exemplary pixel electrode of the first exemplary embodiment of the LCD apparatus according to the present invention.
Figure 8B:
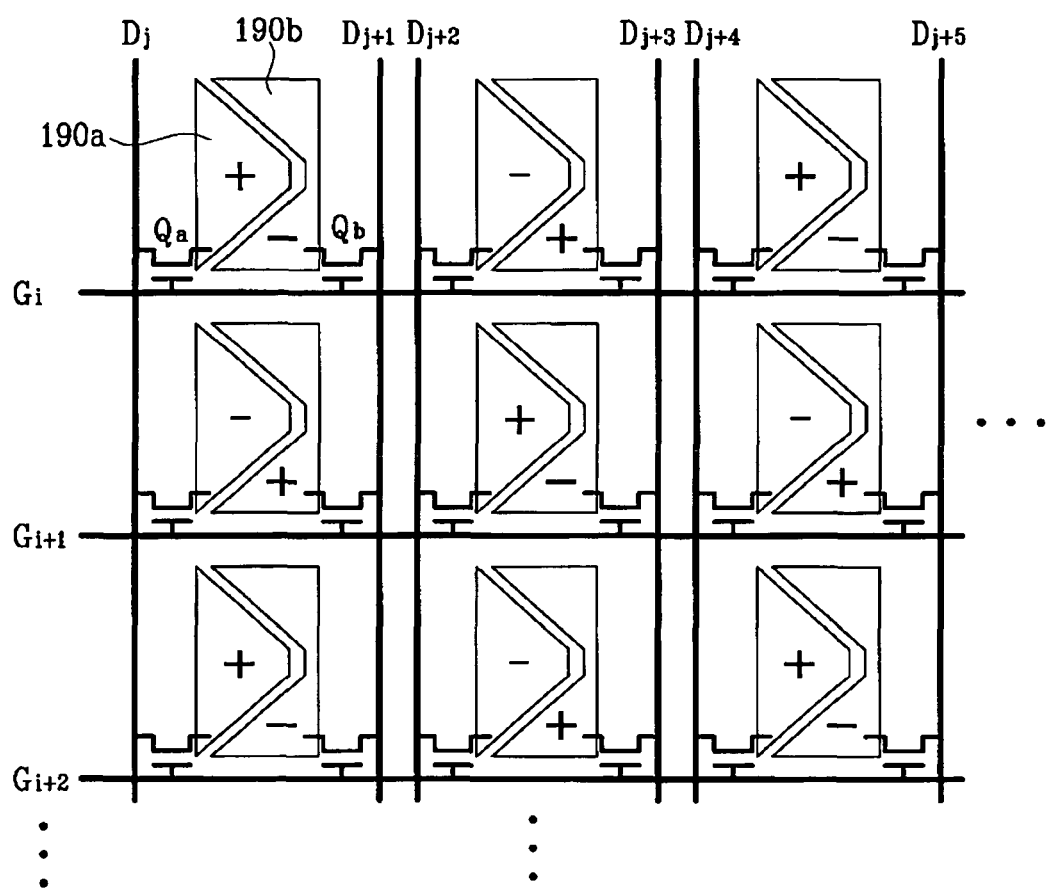

FIGS. 8A and 8B are views showing a polarity state of the exemplary pixel electrode of the first exemplary embodiment of the LCD apparatus according to the present invention.

As shown in FIG. 8A, the polarities of the data voltages flowing through two data lines (for example, $D_j$ and $D_{j+1}$) connected to a pair of the subpixels PXa and PXb constituting one pixel PX are equal to each other. However, the polarities of the data voltages flowing through two data lines (for example, $D_{j+1}$ and $D_{j+2}$) disposed between two adjacent pixels PX are opposite to each other, so that polarities of the two adjacent pixels change. Although FIG. 8A shows the point inversion where the polarities of the pixel electrodes 190 are inverted every pixel, a 1+2 inversion scheme where the polarities are inverted every two pixels may alternatively be employed. According to the inversion scheme, since the polarities of the two subpixel electrodes 190a and 190b constituting one pixel electrode 190 are equal to each other, light leakage does not occur in the aperture 93 between the subpixels PXa and PXb.

On the other hand, as shown in FIG. 8B, the polarities of the data voltages flowing through two data lines (for example, $D_j$ and $D_{j+1}$) connected to a pair of the subpixels PXa and PXb constituting one pixel PX are different from each other. However, the polarities of the data voltages flowing through two data lines (for example, $D_{j+1}$ and $D_{j+2}$) disposed between two adjacent pixels PX are equal to each other. Since the polarities of the adjacent data lines are equal to each other, load on the data lines is reduced, so that it is possible to prevent charge delay of the data voltage and to increase a driving margin of the data driver 500.

Now, a second exemplary embodiment of an LCD apparatus according to the present invention will be described with reference to FIG. 9 together with FIG. 2.

Figure 9:
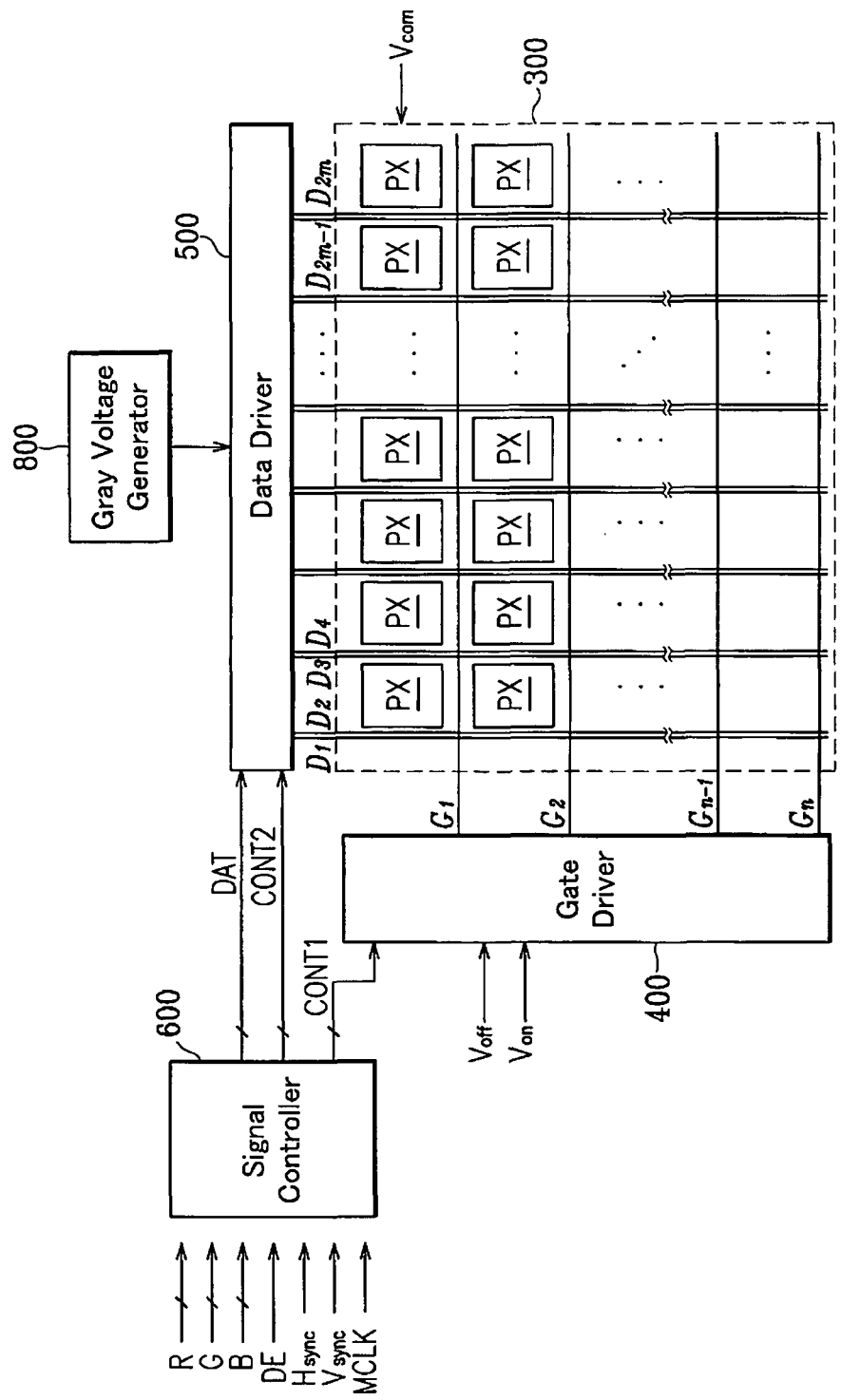
FIG. 9 is a block diagram showing a second exemplary embodiment of an LCD apparatus according to the present invention.

FIG. 9 is a block diagram showing the second exemplary embodiment of an LCD apparatus according to the present invention.

As shown in FIG. 9, the LCD apparatus includes an LCD panel assembly 300, a gate driver 400 and a data driver 500 connected to the LCD panel assembly 300, a grayscale voltage generator 800 connected to the data driver 500, and a signal controller 600 for controlling the components.

Since the second exemplary embodiment of the LCD apparatus according to the present invention is substantially the same as the LCD apparatus shown in FIG. 1, description of the same components is omitted and only different components are described.

The LCD panel assembly 300 includes a lower panel 100 as a TFT panel, an upper panel 200 as a common electrode panel, where the panels 100 and 200 face each other, and a liquid crystal layer 3 interposed therebetween. The LCD panel 300 further includes a plurality of signal lines $G_1$ to $G_n$ and $D_1$ to $D_{2m}$ and a plurality of pixels PX connected thereto and arrayed substantially in a matrix on the lower panel 100.

The display signal lines $G_1$ to $G_n$ and $D_1$ to $D_{2m}$ include a plurality of gate lines $G_1$ to $G_n$ and a plurality of data lines $D_1$ to $D_{2m}$. As shown in FIG. 9, each of the pixels PX includes a pair of subpixels PXa and PXb, and the two data lines $D_1$ to $D_{2m}$ connected to the subpixels PXa and PXb of each respective pixel are disposed at one side of each of the pixels, rather than on opposite sides of each pixel, as in the first exemplary embodiment. Although FIG. 9 shows an arrangement where the two data lines $D_1$ to $D_{2m}$ are disposed at the left side of each pixel, the data lines may alternatively be disposed at the right side thereof.

The odd-numbered data lines $D_{2j-1}$ are connected to the switching devices Qb of the subpixels PXb, and the even-numbered data lines $D_{2j}$ are connected to the switching devices Qa of the subpixels PXa. In other words, alternating data lines are connected to the switching devices Qa and Qb. In order to avoid connection and contact between the data lines $D_{2j-1}$ and the data lines $D_{2j}$, bridge wires (not shown) are connected between the data lines $D_{2j-1}$ and the switching devices Qb.

Now, a structure of the LCD apparatus will be described with reference to FIGS. 10 to 13.

Figure 10:
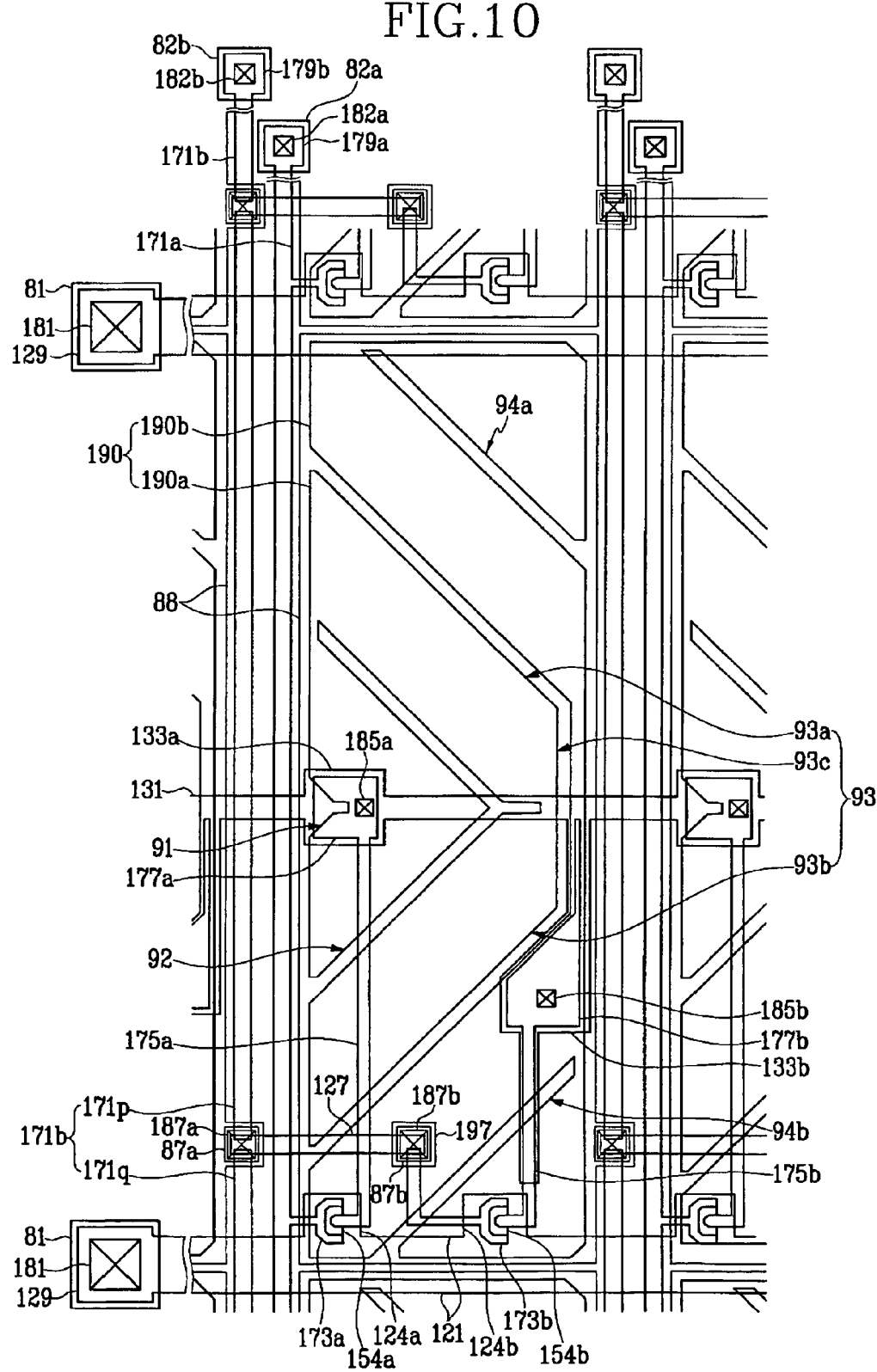
FIG. 10 is a view showing a layout of an exemplary TFT panel for the second exemplary embodiment of the LCD apparatus according to the present invention.
Figure 11:
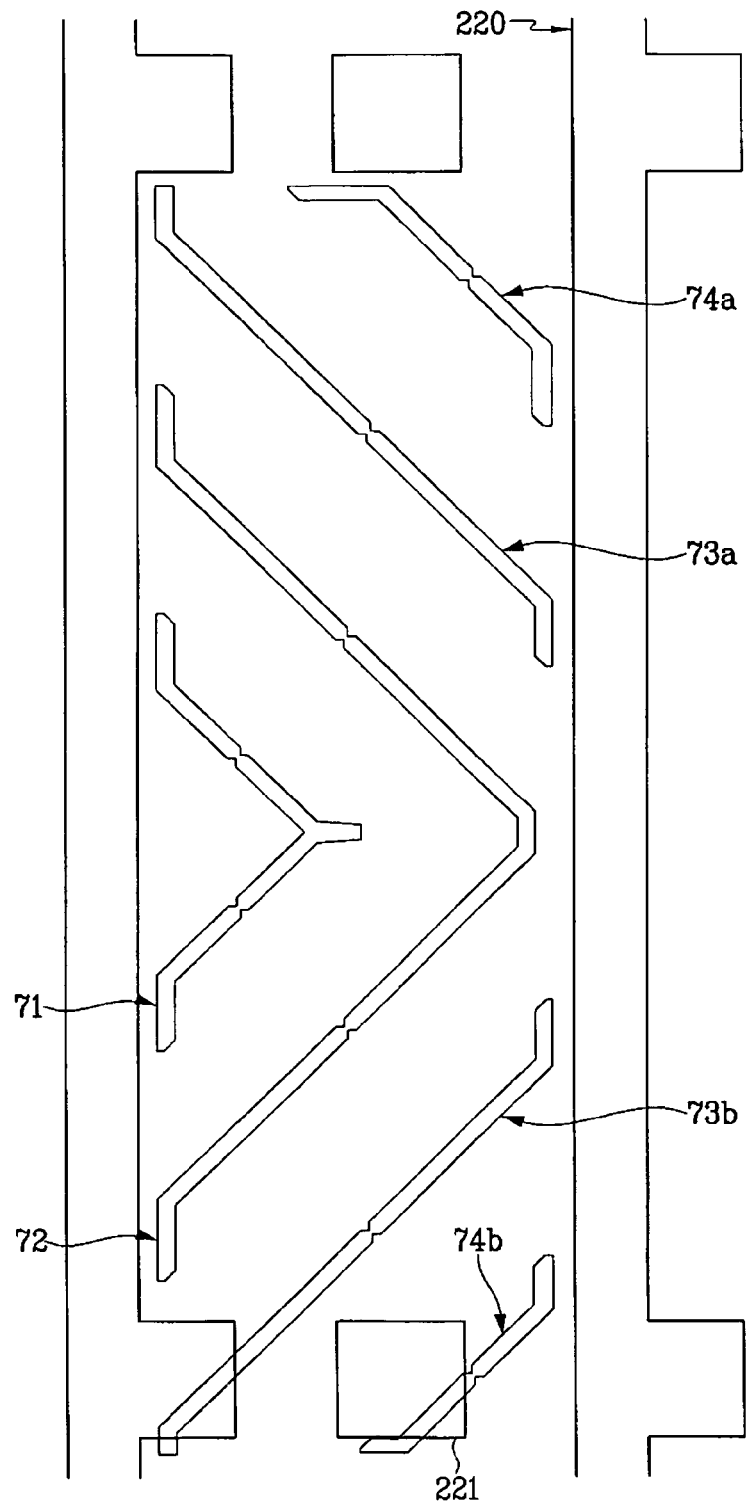
FIG. 11 is a view showing a layout of an exemplary common electrode panel for the second exemplary embodiment of the LCD apparatus according to the present invention.
Figure 12:
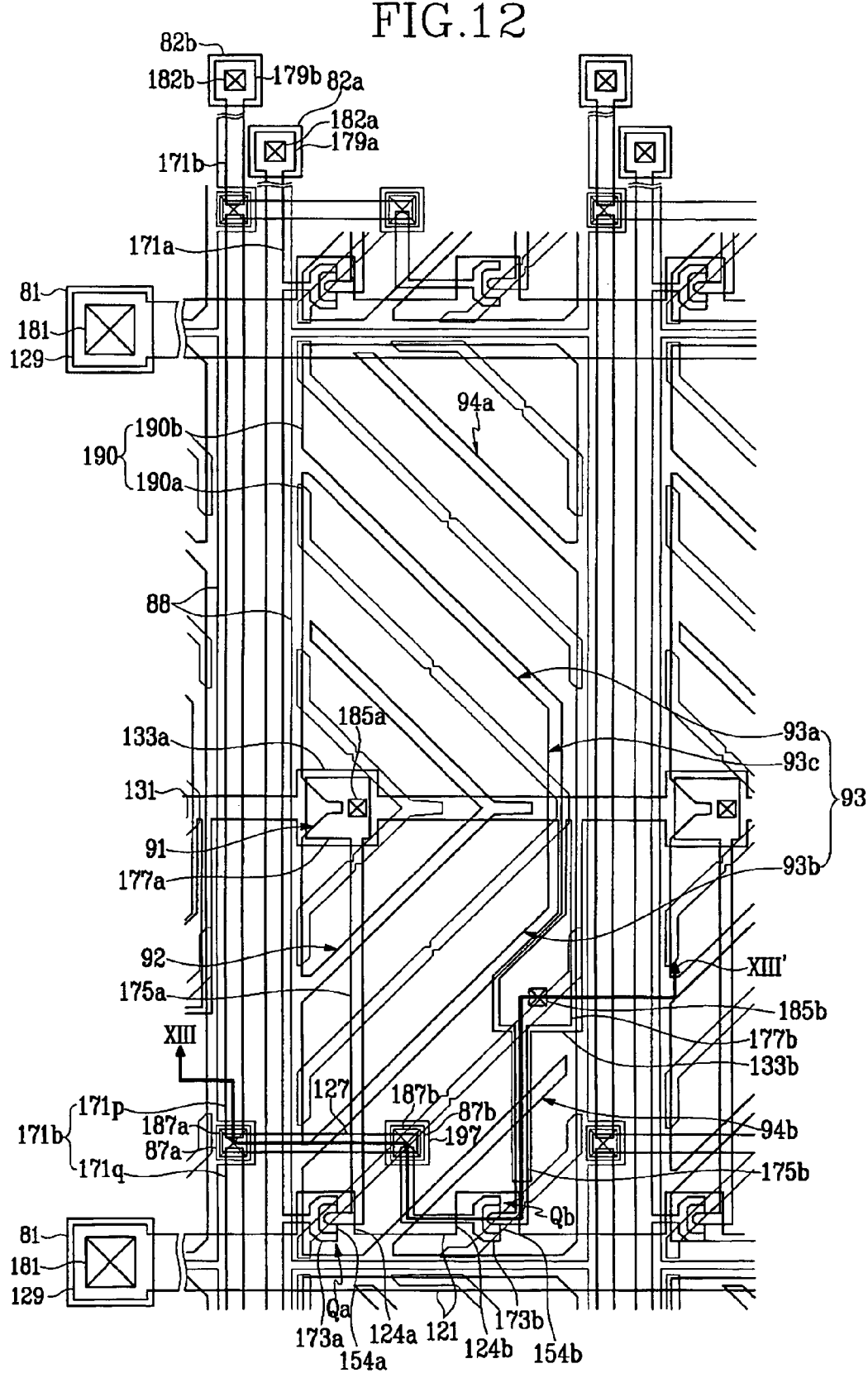
FIG. 12 is a view showing a layout of the second exemplary embodiment of an LCD apparatus constructed with the exemplary TFT panel of FIG. 10 and the exemplary common electrode panel of FIG. 11.
Figure 13:
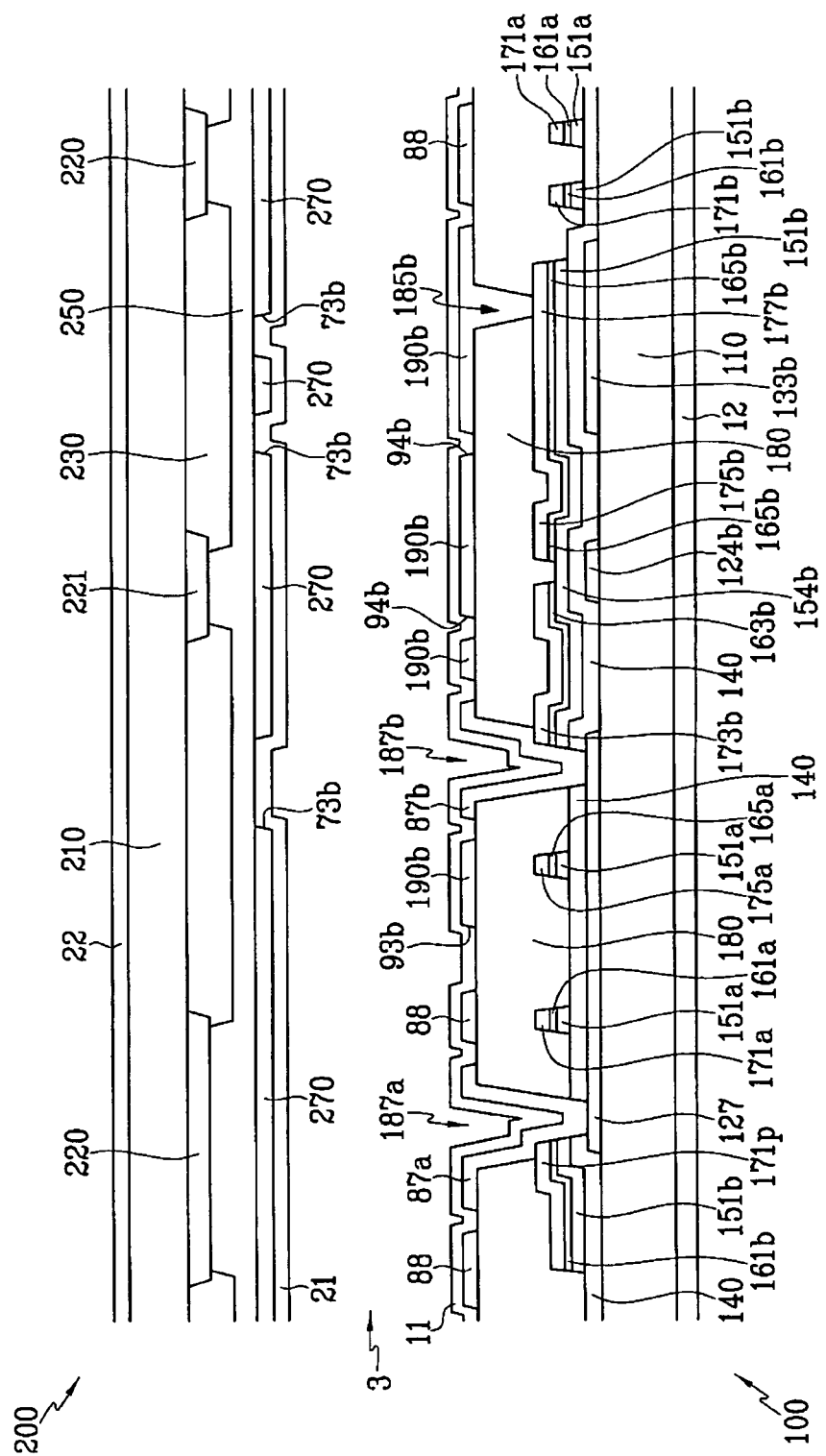
FIG. 13 is a cross sectional view showing the LCD apparatus taken along line XIII-XIII' of FIG. 12.

FIG. 10 is a view showing a layout of an exemplary TFT panel for the second exemplary embodiment of the LCD apparatus according to the present invention, and FIG. 11 is a view showing a layout of an exemplary common electrode panel for the second exemplary embodiment of the LCD apparatus according to the present invention. FIG. 12 is a view showing a layout of the second exemplary embodiment of an LCD apparatus constructed with the exemplary TFT panel of FIG. 10 and the exemplary common electrode panel of FIG. 11. FIG. 13 is a cross sectional view showing the LCD apparatus taken along line XIII-XIII' of FIG. 12.

As show in FIGS. 10 to 13, since the layered structure of the second exemplary embodiment of the LCD apparatus according to the present invention is substantially equal to the layered structure of the LCD apparatus shown in FIGS. 4 to 7B, description of the same components is omitted and only different components are described.

In the TFT panel 100, a plurality of gate lines 121 including a plurality of gate electrodes 124, a plurality of storage electrode lines 131 including a plurality of storage electrodes 133*a* and 133*b*, and a plurality of connection bridges 127 are formed on a substrate 110.

The connection bridges 127 are made of the same material and within a same layer of the TFT panel 100 as the gate lines 121 and the storage electrode lines 131. Also, the connection bridges 127 extend substantially parallel to the gate line 121 and the storage electrode line 131, however alternate shapes and directions are within the scope of these embodiments.

A gate insulating layer 140, semiconductors 151*a* and 151*b*, and ohmic contact members 161*a*, 161*b*, 163*a*, 163*b*, 165*a*, and 165*b* are sequentially formed on the gate lines 121, the storage electrode lines 131, and the connection bridges 127.

A plurality of data lines 171*a* and 171*b* and pluralities of source electrodes 173*a* and 173*b* and drain electrodes 175*a* and 175*b*, which are separated from the data lines 171*a* and 171*b*, are sequentially formed on the ohmic contact members 161*a*, 161*b*, 163*a*, 163*b*, 165*a*, and 165*b*. Since the source electrode 173*b* is to be connected to a data line 171*b* adjacent to a same side of the pixel electrode 190 as the data line 171*a*, the source electrode 173*b* opens in a same direction as the source electrode 173*a*.

The data lines 171*b* include a plurality of first and second portions 171*p* and 171*q* which extend in the transverse direction, substantially perpendicular to the gate lines 121, and are separated from each other. The first and second portions 171*p* and 171*q* of the data lines 171*b* have end portions which overlap first end portions of the connection bridges 127 and are electrically connected to each other. In addition, portions of the source electrodes 173*b* overlap second end portions of the connection bridges 127 and are electrically connected to the data lines 171*b*.

A protective film 180, such as a passivation layer, is formed on the data lines 171*a* and 171*b*, the source electrodes 173*a* and 173*b*, the drain electrodes 175*a* and 175*b*, and the exposed protrusions 154*a* and 154*b* of the semiconductors 151*a* and 151*b*.

In the protective film 180, a plurality of contact holes 182*a*, 182*b*, 185*a*, and 185*b* are formed, and another plurality of contact holes 181, 187*a*, and 187*b* are formed in the protective film 180 and the gate insulating layer 140.

A plurality of subpixel electrodes 190*a* and 190*b*, shielding electrodes 88, a plurality of contact assistant members 81, 82*a*, and 82*b*, and a plurality of connection members 87*a* and 87*b* are formed on the protective film 180.

The connection members 87*a* and 87*b* are constructed with the same material and within a same layer as the subpixel electrodes 190*a* and 190*b*, the shielding electrodes 88, and the contact assistant members 81, 82*a*, and 82*b*, and have a function of connecting the data lines 171*b*, the connection bridges 127, and the source electrodes 173*b* through the contact holes 187*a* and 187*b*. On the other hand, the shielding electrodes 88 have concave portions so as not to contact the connection members 87*a*, and the subpixel electrodes 190*b* have openings 197 so as not to contact the connection members 87*b*.

In the common electrode panel 200, a light-shielding member 220 and a plurality of color filters 230 are formed on a substrate 210, a cover film 250 is formed thereon, and a common electrode 270 is formed on the cover film 250. The light-shielding member 220 includes an island-shaped light-shielding member 221 for shielding the TFTs Qb.

Alignment films 11 and 21 are formed on inner surfaces of the panels 100 and 200, and polarizing plates 12 and 22 are formed on outer surfaces thereof.

Now, a polarity and an inversion scheme of the pixel electrodes of the LCD apparatus will be described with reference to FIG. 14.

Figure 14:
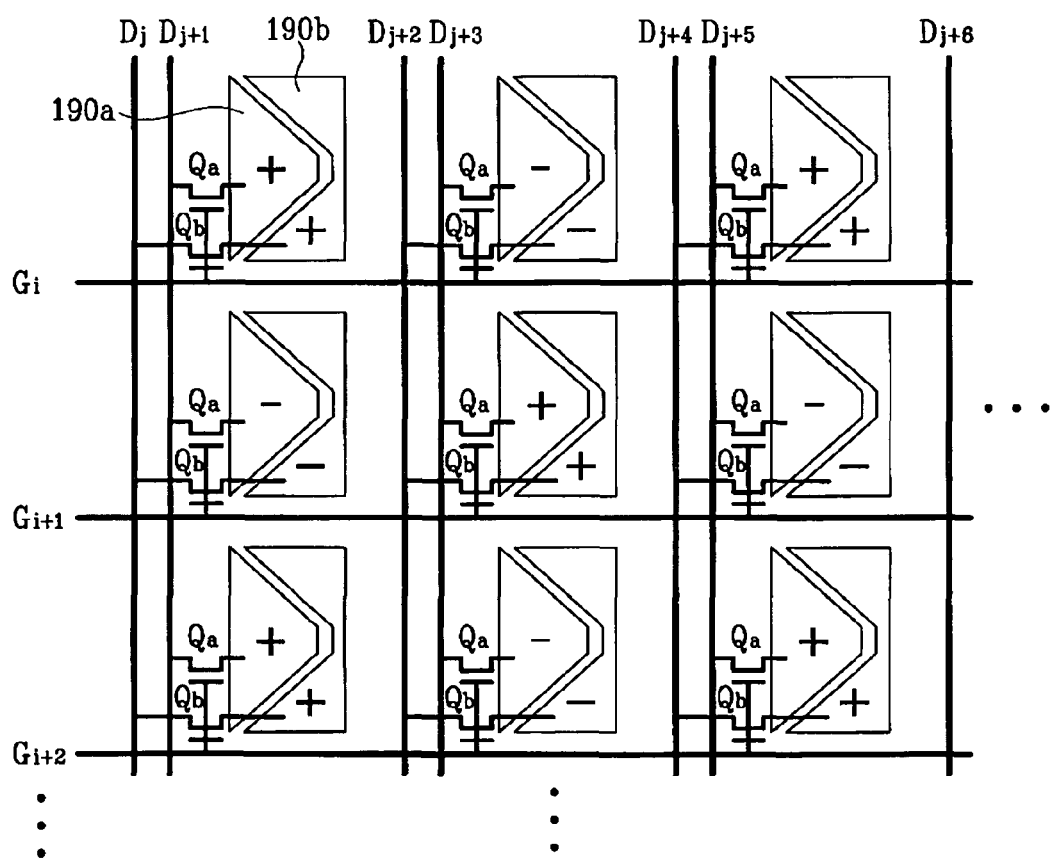
FIG. 14 is a view showing a polarity state of the exemplary pixel electrode of the second exemplary embodiment of the LCD apparatus according to the present invention.

FIG. 14 is a view showing a polarity state of the exemplary pixel electrode of the second exemplary embodiment of the LCD apparatus according to the present invention.

As shown in FIG. 14, the polarities of the data voltages flowing through two data lines (for example, $D_j$ and $D_{j+1}$) connected to a pair of the subpixels PXa and PXb constituting one pixel PX are equal to each other. In addition, the two data lines for the one pixel PX are disposed between two adjacent pixels PX.

Accordingly, since the polarities of the two subpixel electrodes 190a and 190b constituting one pixel electrode 190 are equal to each other, light leakage does not occur in the aperture 93 between the subpixels PXa and PXb, as previously described with respect to the first exemplary embodiment of the LCD apparatus.

In addition, since the polarities of the adjacent data lines for each pixel PX are equal to each other, load on the data lines is reduced, so that it is possible to prevent charge delay of the data voltage and to increase driving margin of the data driver 500.

On the other hand, although FIG. 14 shows the point inversion where the polarities of the pixel electrodes 190 are inverted every pixel, a 1+2 inversion scheme where the polarities are inverted every two pixels may be alternatively employed.

Now, a third exemplary embodiment of an LCD apparatus according to the present invention will be described with reference to FIG. 15.

Figure 15:
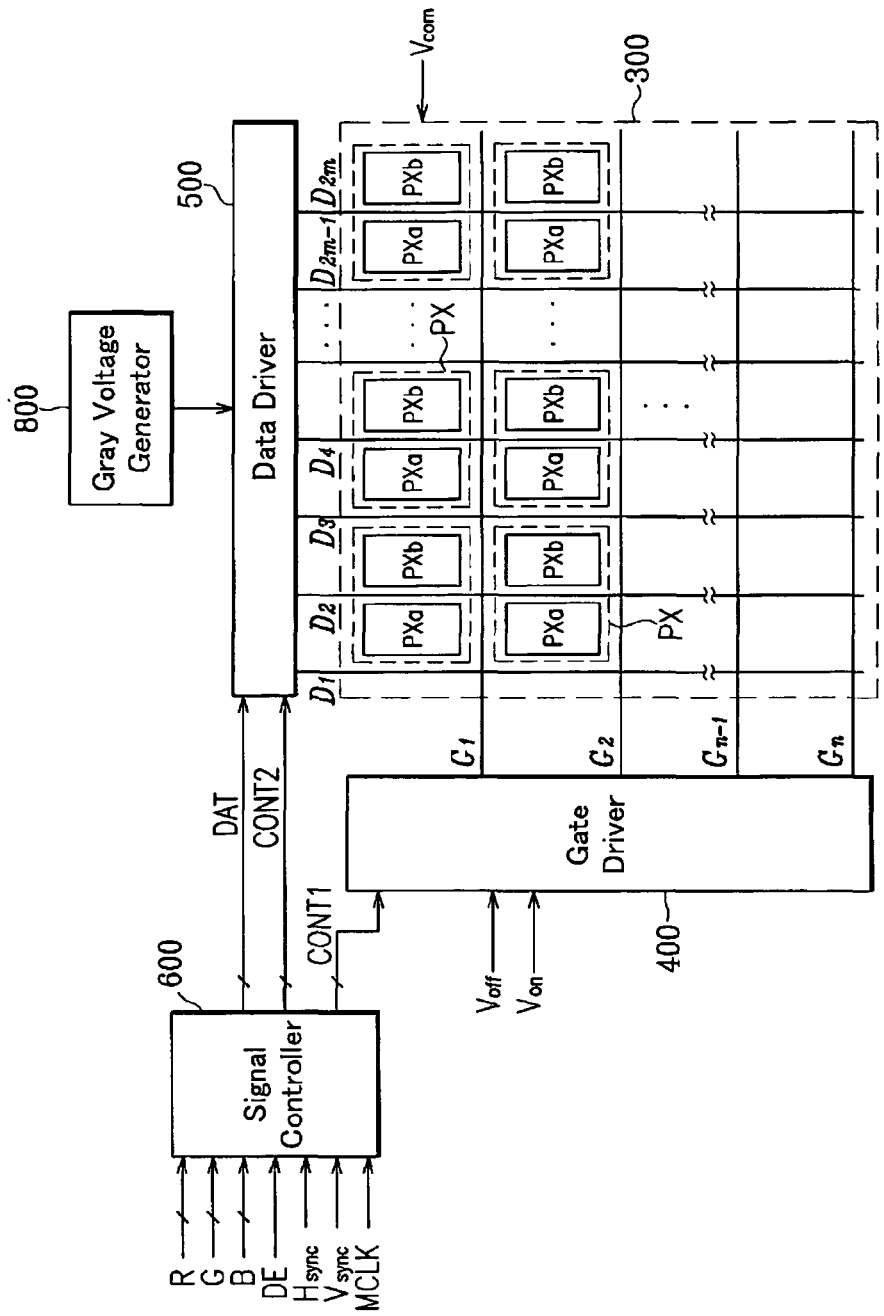
FIG. 15 is a block diagram showing a third exemplary embodiment of an LCD apparatus according to the present invention.

FIG. 15 is a block diagram showing the third exemplary embodiment of an LCD apparatus according to the present invention.

As shown in FIG. 15, the LCD apparatus includes an LCD panel assembly 300, a gate driver 400 and a data driver 500 connected to the LCD panel assembly 300, a grayscale voltage generator 800 connected to the data driver 500, and a signal controller 600 for controlling the components.

Since the third exemplary embodiment of the LCD apparatus according to the present invention is substantially the same as the LCD apparatus shown in FIG. 1, description of the same components is omitted and only different components are described.

The LCD panel assembly 300 includes a lower panel 100 as a TFT panel, an upper panel 200 as a common electrode panel, where the panels 100 and 200 face each other, and a liquid crystal layer 3 interposed therebetween. The LCD panel 300 further includes a plurality of signal lines $G_1$ to $G_n$ and $D_1$ to $D_{2m}$ and a plurality of pixels PX connected thereto and arrayed substantially in a matrix on the lower panel 100.

The display signal lines $G_1$ to $G_n$ and $D_1$ to $D_{2m}$ include a plurality of gate lines $G_1$ to $G_n$ and a plurality of data lines $D_1$ to $D_{2m}$. Each of the pixels PX includes a pair of subpixels PXa and PXb, and the two data lines $D_1$ to $D_{2m}$ connected to the subpixels PXa and PXb are disposed at one side of each of the sub pixels. Thus, each pixel PX is divided by one of the two data lines dedicated to each column of pixels PX. Although FIG. 15 shows the arrangement where the two data lines $D_1$ to $D_{2m}$ are disposed at the left side of each sub pixel, the data lines may be disposed at the right side thereof.

An aspect ratio of one pixel PX is substantially 1:3, and if the sizes of the subpixels PXa and PXb are equal to each other, the aspect ratio of each of the subpixels PXa and PXb is substantially 1:6. In order to increase a side visibility, the transverse lengths of the subpixels PXa and PXb are designed to be different from each other.

Now, a structure of the LCD apparatus will be described with reference to FIGS. 16 to 19.

Figure 16:
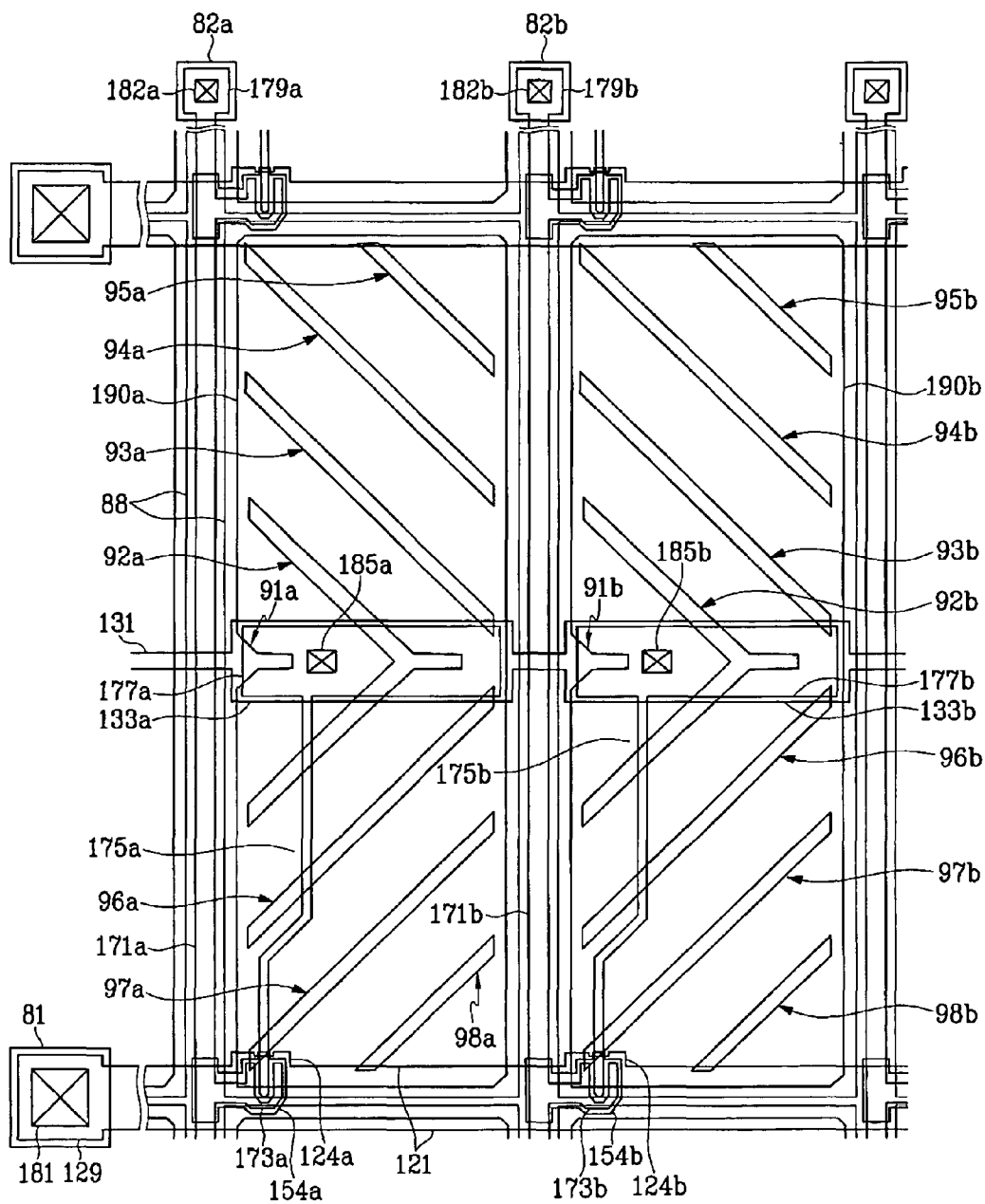
FIG. 16 is a view showing a layout of an exemplary TFT panel for the third exemplary embodiment of the LCD apparatus according to the present invention.
Figure 17:
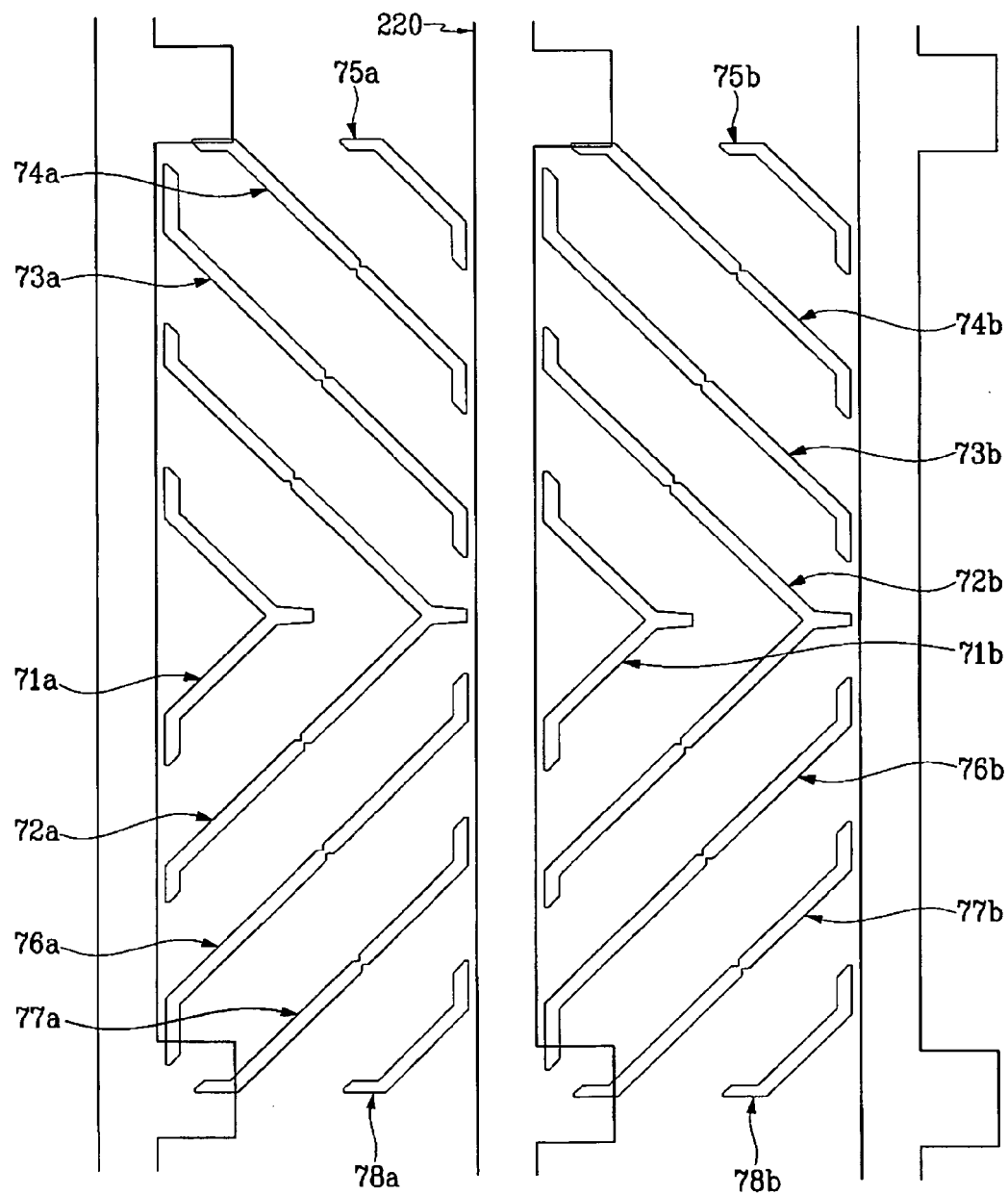
FIG. 17 is a view showing a layout of an exemplary common electrode panel for the third exemplary embodiment of the LCD apparatus according to the present invention.
Figure 18:
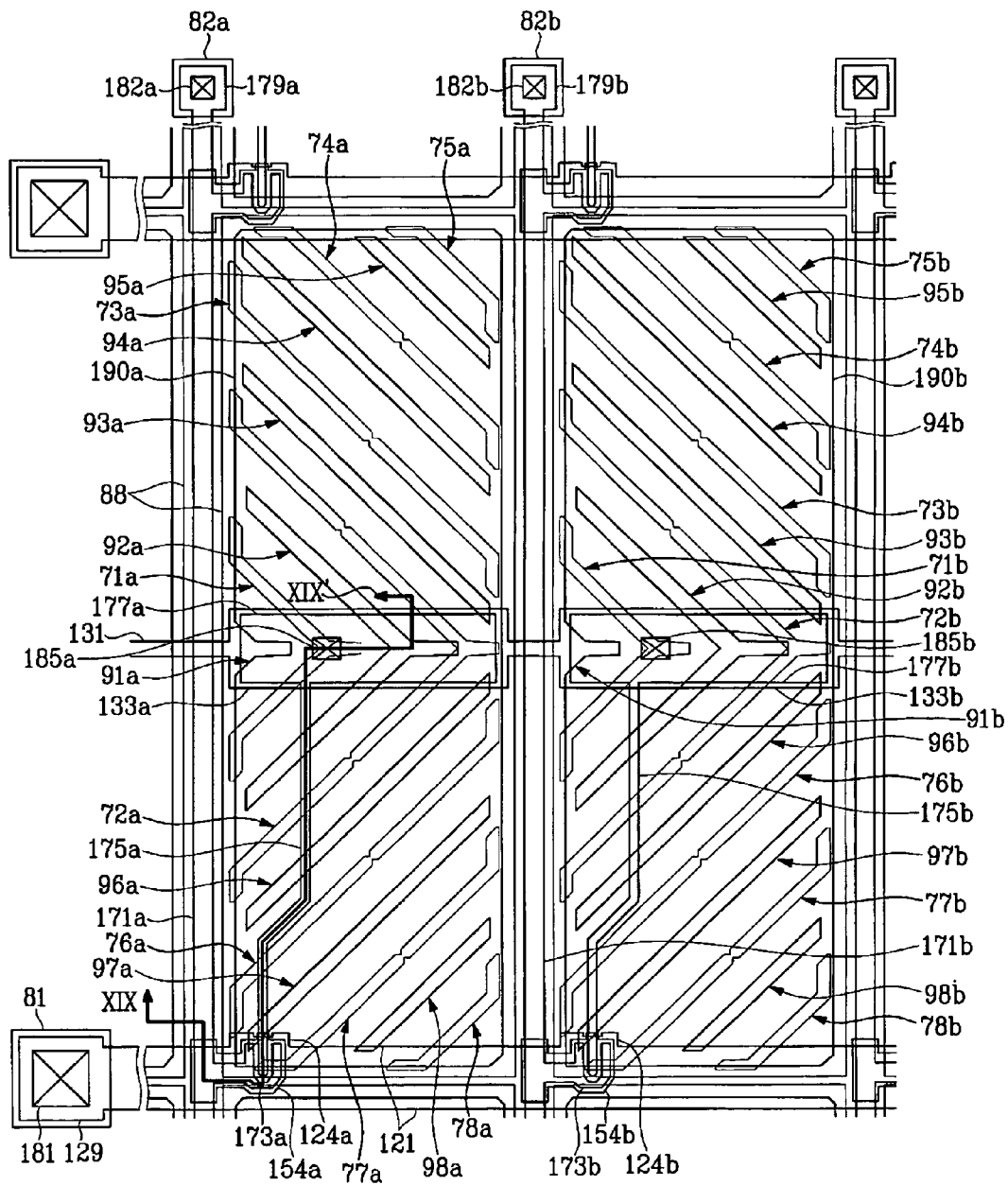
FIG. 18 is a view showing a layout of the third exemplary embodiment of an LCD apparatus constructed with the exemplary TFT panel of FIG. 16 and the exemplary common electrode panel of FIG. 17.
Figure 19:
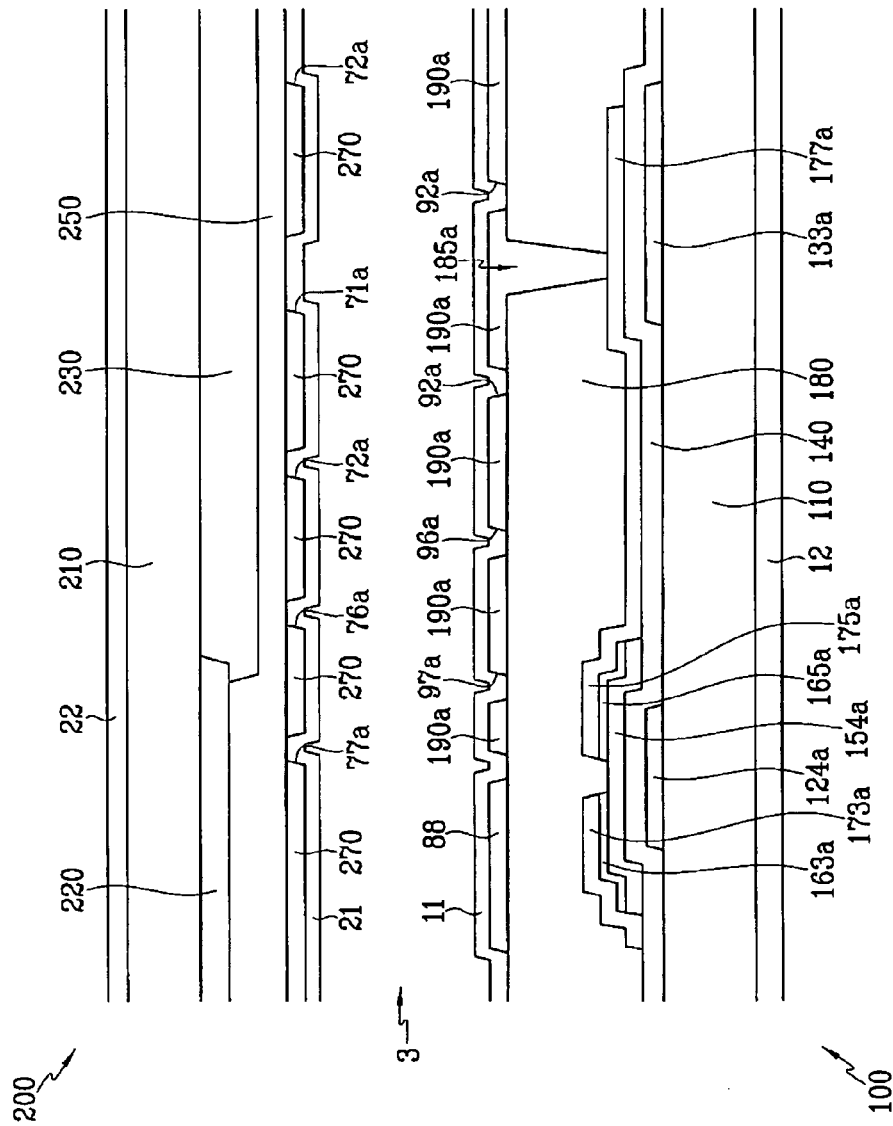
FIG. 19 is a cross sectional view showing the LCD apparatus taken along line XIX-XIX' of FIG. 18.

FIG. 16 is a view showing a layout of an exemplary TFT panel for the third exemplary embodiment of the LCD apparatus according to the present invention, and FIG. 17 is a view showing a layout of an exemplary common electrode panel for the third exemplary embodiment of the LCD apparatus according to the present invention. FIG. 18 is a view showing a layout of the third exemplary embodiment of an LCD apparatus constructed with the exemplary TFT panel of FIG. 16 and the exemplary common electrode panel of FIG. 17. FIG. 19 is a cross sectional view showing the LCD apparatus taken along line XIX-XIX' of FIG. 18.

Each pixel PX of the LCD apparatus includes two subpixels PXa and PXb having substantially the same structure.

Therefore, in the following description, one subpixel PXa will be described, and duplicative portions of a description of the other subpixel PXb will be omitted.

The LCD apparatus includes a TFT panel 100 and a common electrode panel 200, which face each other, and a liquid crystal layer 3 interposed between the two panels 100 and 200.

First, the TFT panel 100 will be described with reference to FIGS. 16, 18, and 19.

A plurality of gate lines 121 and a plurality of storage electrode lines 131 are disposed on a dielectric substrate 110 made of a transparent glass or the like, such as other transparent insulating materials.

The gate lines 121 mainly extend in a first direction, such as a longitudinal direction, are separated from each other, and transmit gate signals. Each of the gate lines 121 includes a plurality of protrusions constituting a plurality of gate electrodes 124a and an end portion 129 having a wide area for connection to other layers or external apparatuses. The gate electrodes 124a may be positioned adjacent a first corner of the subpixel PXa.

The storage electrode lines 131 extend mainly in the first direction, such as the longitudinal direction substantially parallel to the gate lines 121, and include a plurality of protrusions constituting storage electrodes 133a.

Each storage electrode 133a is in a shape of a rectangle and has symmetry about the storage electrode line 131. A predetermined voltage, such as a common voltage Vcom applied to the common electrode 270 of the common electrode panel 200 of the LCD apparatus, is also applied to the storage electrode line 131.

The gate lines 121 and the storage electrode lines 131 may be made of an aluminum based metal such as aluminum (Al) and an aluminum alloy, a silver based metal such as silver (Ag) and a silver alloy, a copper based metal such as copper (Cu) and a copper alloy, a molybdenum based metal such as molybdenum (Mo) and a molybdenum alloy, chromium (Cr), titanium (Ti), or tantalum (Ta).

Alternatively, the gate lines 121 and the storage electrode lines 131 may have a multi-layered structure including two conductive layers (not shown) having different physical properties. In such a case, one of the two conductive layers would be made of a metal having a low resistivity, for example, an aluminum based metal, a silver based metal, and a copper based metal, in order to reduce signal delay or voltage drop of the gate lines 121 and the storage electrode lines 131, and the other conductive layer would be made of a material having a good contactness to other materials, particularly, ITO and IZO, such as a molybdenum based metal, chromium, titanium, and tantalum.

As preferred examples of the combination, the multi-layered structure may include a lower chromium layer and an upper aluminum layer and a lower aluminum layer and an upper molybdenum layer.

However, while particular examples have been described, it should be understood that the gate lines 121 and the storage electrode lines 131 may be made of various metals and conductive materials.

In addition, side surfaces of the gate lines 121 and the storage electrode lines 131 are slanted with respect to a surface of the substrate 110, and it is preferable that the slanted angle is in a range of about 30° to about 80°.

A gate insulating layer 140 made of a silicon nitride $SiN_x$ or the like is formed on the gate lines 121 and the storage electrode lines 131, and may be further formed on the exposed portions of the substrate 110 not covered by the gate lines 121 or the storage electrode lines 131.

A plurality of island-shaped semiconductors 154a made of hydrogenated a-Si is formed above the gate insulating layer 140. The island-shaped semiconductors 154a are mainly disposed over the gate electrodes 124a.

A plurality of island-shaped ohmic contact members 163a and 165a made of a silicide or n+ hydrogenated a-Si, or the like, which are doped with n type impurities such as phosphorus (P), are formed above the semiconductors 154a. The two pairs of the island-shaped ohmic contact members 163a and 165a are disposed on the semiconductors 154a and face each other with respect to the gate electrode 124a as a center thereof.

Side surfaces of the island-shaped semiconductors 154a and ohmic contact members 163a and 165a are also slanted with respect to the surface of the substrate 110, and the slanted angle is in a range of about 30° to about 80°.

A plurality of data lines 171a and a plurality of drain electrodes 175a which are separated from the plurality of data lines 171a are formed on the ohmic contact members 163a and 165a and the gate insulating layer 140.

The data lines 171a extend mainly in the second direction, such as the transverse direction, to substantially perpendicularly intersect the gate lines 121 and the storage electrode lines 131, and apply the data voltages. The data lines 171a have a plurality of source electrodes 173a which overlap the ohmic contact members 163a and extend toward the drain electrodes 175a and end portions 179a which have enlarged widths for connection to other layers or external apparatuses.

The drain electrodes 175a extend mainly in the transverse direction, parallel to the data lines 171a, and have enlarged portions 177a which overlap with the storage electrodes 133a. The sides of the enlarged portions 177a of the drain electrodes 175a are substantially parallel to the sides of the storage electrodes 133a. The gate electrodes 124a, the source electrodes 173a, and the drain electrodes 175a together with the semiconductors 154a constitute the TFTs (TFT) Qa. Channels of the TFTs Qa are formed on the semiconductors 154a between the source electrodes 173a and the drain electrodes 175a, respectively.

The data lines 171a and the drain electrodes 175a are preferably made of chromium, a molybdenum based metal, or a refractory metal such as tantalum and titanium, and may have a multi-layered structure which is constructed with a lower layer (not shown) made of the refractory metal and an upper layer (not shown) made of a low resistance material disposed thereon.

As an example of the multi-layered structure, in addition to the aforementioned two-layered structure of a lower chromium or molybdenum layer and an upper aluminum layer, there may be a three-layered structure of a molybdenum layer/an aluminum layer/a molybdenum layer.

Similar to the gate lines 121 and the storage electrode lines 131, the side surfaces of the data lines 171a and the drain electrodes 175a are slanted with respect to the substrate 110 at an angle ranging from about 30° to about 80°.

The ohmic contact members 163a and 165a are interposed only between the underlying semiconductors 154a and the overlying data lines 171a, source electrodes 173a, and drain electrodes 175a and have a function of reducing contact resistance. The island-shaped semiconductors 154a have exposed portions uncovered between the source electrodes 173a and the drain electrodes 175a and by the data lines 171a and the drain electrodes 175a.

A protective film 180, such as a passivation layer, is formed on the data lines 171a, the source electrodes 173a, the drain electrodes 175a, and the exposed semiconductors 154a. The protective film 180 is made of an inorganic material such as a silicon nitride and a silicon oxide, an organic material having an excellent planarization property and photosensitivity, and a low dielectric-constant insulating material formed by PECVD, such as a-Si:C:O and a-Si:O:F. However, in order to use the excellent properties of an organic film and to protect the exposed portions of the semiconductors 154a, the protective film 180 may have a two-layered structure including a lower inorganic film and an upper organic film.

In the protective film 180, a plurality of contact holes 185a and 182a which expose the enlarged portions 177a of the drain electrodes 175a and the end portions 179a of the data lines 171a are formed, and a plurality of contact holes 181, which expose the end portions 129 of the gate lines 121 are formed in the protective film 180 and the gate insulating layer 140.

On the protective film 180, a plurality of the subpixel electrodes 190a, a plurality of shielding electrodes 88, and a plurality of contact assistant members 81 and 82a are formed. The subpixel electrodes 190a, the shielding electrodes 88, and the contact assistant members 81 and 82a are made of a transparent conductive material, such as ITO and IZO, or a reflective conductive material such as aluminum.

The subpixel electrodes 190a are physically and electrically connected through the contact holes 185a to the drain electrodes 175a to receive data voltages from the drain electrodes 175a.

The subpixel electrodes 190a applied with the data voltages, together with the common electrode 270, generate electric fields, so that alignment of the liquid crystal molecules of the liquid crystal layer 3 between the two electrodes 190a and 270 can be determined.

The subpixel electrodes 190a and the common electrode 270 constitute liquid crystal capacitors $C_{LCa}$ to sustain the applied voltages although the TFTs Qa turns off. In order to increase the voltage storage capability, storage capacitors $C_{STa}$ connected in parallel to the liquid crystal capacitors $C_{LCa}$ are provided. Each storage capacitor $C_{STa}$ is constructed by overlapping the subpixel electrodes 190a and the storage electrode line 131. In order to increase electric capacitance of the storage capacitor $C_{STa}$, that is, storage capacitance, storage electrodes 133a are provided to the storage electrode line 131 and are overlapped with the enlarged portions 177a of the drain electrodes 175a connected to the subpixel electrodes 190a through the contact hole 185a, so that the distance between ports is reduced and the overlapped area is enlarged.

The subpixel electrode 190a has a shape of an approximate rectangle. The corners thereof may be partially cut, and the cut sides have an angle of about 45° with respect to the gate line 121.

The subpixel electrode 190a has a plurality of central apertures 91a and 92a, upper apertures 93a, 94a, and 95a, and lower apertures 96a, 97a, and 98a. The subpixel electrode 190a is divided into a plurality of small regions by these apertures 91a to 98a. The upper and lower apertures 93a to 95a and 96a to 98a are disposed in upper and lower half regions of the subpixel electrode 190a, respectively, and the central apertures 91a and 92a are disposed between the upper apertures 93a to 95a and the lower apertures 96a to 98a. The apertures 91a to 98a have an approximate inversion symmetry with respect to a central longitudinal line of the subpixel electrode 190a dividing the upper and lower half regions of the subpixel electrode 190a. For example, the storage electrode line 131 may divide the upper and lower half regions of the subpixel electrode 190a, and the apertures 91a to 98a may be mirror images of each other with respect to the storage electrode line 131.

The upper and lower apertures 93a to 95a and 96a to 98a have an angle of about 45° with respect to the gate lines 121. The upper apertures 93a to 95a and the lower apertures 96a to 98a are perpendicular to each other.

The upper apertures 93a to 95a are parallel to each other and parallel to upper portions of the central apertures 91a and 92a, and the lower apertures 96a to 98a are also parallel to each other and parallel to lower portions of the central apertures 91a and 92a.

The apertures 95a and 98a extend from the transverse side adjacent the data line 171b to opposing upper and lower longitudinal sides of the subpixel electrode 190a. The apertures 94a and 97a extend from the right side of the subpixel electrode 190a, adjacent the data line 171b, to the opposing left corners of the subpixel electrode 190a, which may be uncut. The apertures 93a and 96a extend from the right corners of the upper and lower half regions of the subpixel electrode 190a to the left transverse side of the subpixel electrode 190a, adjacent the data line 171a.

The central aperture 92a has a longitudinal portion which extends along the central transverse line of the subpixel electrode 190a, corresponding to the storage electrode line 131, and a pair of slanted portions which extend in perpendicularly opposite directions from the longitudinal portion of the central aperture 92a to the left side of the subpixel electrode 190a and in parallel to the upper apertures 93a to 95a and the lower apertures 96a to 98a, respectively. The central aperture 91a also has an inlet which extends along the central transverse line of the subpixel electrode 190a, corresponding to the storage electrode line 131, and is formed at the left side of the subpixel electrode 190a adjacent the data line 171a, and the inlet has a pair of slanted sides which are parallel to the upper apertures 93a to 95a and the lower apertures 96a to 98a, respectively.

Accordingly, the upper half region of the subpixel electrode 190a is divided into five small regions by the central apertures 91a and 92a and the upper apertures 93a to 95a, and the lower half region is also divided into five small regions by the central apertures 91a and 92a and the lower apertures 96a to 98a. Here, the number of regions or the number of apertures may vary according to a size of the pixel PX, an aspect ratio of the subpixel electrodes 190a, a type or characteristics of the liquid crystal layer 3, or other design factors.

The subpixel electrode 190a overlaps with adjacent gate lines 121, so that an aperture ratio thereof increases.

The shielding electrodes 88 extend along the data lines 171a and the gate lines 121. Portions thereof disposed over the data lines 171a entirely cover the data lines 171a, and portions thereof disposed over the gate lines 121 have a width smaller than widths of the gate lines 121 and are disposed within boundaries of the gate lines 121. Alternatively, the widths of the shielding electrodes 88 may be adjusted to be smaller than those of the data lines 171a, and boundary lines thereof may be located outside the boundaries of the gate lines 121. In order to apply a common voltage Vcom to the shielding electrodes 88, the shielding electrodes 88 may be connected through contact holes (not shown) within the protective film 180 and the gate insulating layer 140 to the storage electrode line 131 or a short point (not shown) through which the common voltage Vcom is transmitted from the TFT panel 100 to the common electrode panel 200.

Here, it is preferable that a distance between the shielding electrode 88 and the pixel electrode 190 is designed to be minimized in order to minimize the decrease in the aperture ratio.

In such an arrangement, if the shielding electrodes 88 applied with the common voltage Vcom are disposed over the data lines 171a, the shielding electrodes 88 shield the electric field generated between the data lines 171a and the subpixel electrodes 190a and 190b and between the data lines 171a and the common electrode 270, so that voltage distortion of the subpixel electrodes 190a and 190b and signal delay and distortion of the data voltage transmitted by the data lines 171a can be reduced.

In addition, since the subpixel electrodes 190a and 190b and the shielding electrodes 88 are separated from each other by a distance in order to prevent a short-circuit therebetween, the subpixel electrodes 190a and 190b can be further separated from the data lines 171a, so that parasite capacitance therebetween can be reduced. In addition, since a permittivity of the liquid crystal layer 3 is higher than that of the protective film 180, the parasite capacitance between the data lines 171a and the shielding electrodes 88 is lower than the parasite capacitance between the data lines 171a and the common electrode 270 in a case where the shielding electrodes 88 are not provided.

In addition, since the subpixel electrodes 190a and 190b and the shielding electrodes 88 are constructed with the same layer, the distance therebetween can be uniformly maintained, so that the parasite capacitance therebetween is uniform.

The contact assistant members 81 and 82a are connected through the contact holes 181 and 182a to the end portions 129 of the gate lines 121 and the end portions 179a of the data lines 171a, respectively. The contact assistant members 81 and 82a have a function of compensating for adhesiveness of the exposed end portions 129 of the gate lines 121 and the exposed end portions 179a of the data lines 171a to external apparatuses, and of protecting these portions.

When the gate driver 400 or the data driver 500 shown in FIG. 15 is integrated in the TFT panel 100, the gate lines 121 or the data lines 171a extend to be directly connected to the drivers. In this case, the contact assistant members 81 and 82a may be used to connect the gate lines 121 and the data lines 171a to the drivers 400 and 500, respectively.

On the subpixel electrode 190a, the contact assistant members 81 and 82a, and the protective film 180 an alignment film 11 for aligning the liquid crystal layer 3 is coated. The alignment film 11 may be a vertical alignment film.

Next, the common electrode panel 200 will be described with reference to FIGS. 17 to 19.

A light-shielding member 220 for preventing light leakage, also termed a black matrix, is formed on a dielectric substrate 210 made of a transparent glass or the like, such as other transparent insulating materials.

The light-shielding member 220 includes a plurality of opening portions which face the pixel electrodes 190 and have substantially the same shape as the pixel electrodes 190. Alternatively, the light-shielding member 220 may be constructed with portions corresponding to the data lines 171a and portions corresponding to the TFT Qa. However, the light-shielding member 220 may have various shapes in order to shield the light leakage in a vicinity of the subpixel electrode 190a and the TFT Qa.

A plurality of color filters 230 are formed on the substrate 210. The color filters 230 are disposed in most regions surrounded by the light-shielding member 220 and extend along the pixel electrodes 190 in the transverse direction.

The color filters 230 can display one of the colors, i.e., red, green, or blue, or other colors not otherwise described herein.

A cover film 250 is formed on the color filters 230 and the light-shielding member 220 in order to prevent the color filters 230 from being exposed and to provide a planarized surface.

A common electrode 270 made of a transparent conductive material, such as, but not limited to, ITO and IZO, is formed on the cover film 250.

The common electrode 270 includes a plurality of apertures 71 to 78b, as shown in FIGS. 17 and 18.

The apertures 71a to 78a face one of the subpixel electrodes 190a and include central apertures 71a and 72a and upper and lower apertures 73a to 75a and 76a to 78a. The apertures 71a to 78a are disposed in locations on the common electrode 270 corresponding to locations between adjacent apertures 91a to 98a of the subpixel electrode 190a or between the apertures 94a and 98a and the slanted sides of the subpixel electrode 190a. In addition, each of the apertures 71a to 78a has at least one slanted portion which extends parallel to the upper apertures 93a to 95a or the lower apertures 96a to 98a of the subpixel electrode 190a, and the distances between adjacent parallel apertures 91a to 98a and 71a to 78a, and between the slanted portions thereof and the slanted sides of the subpixel electrode 190a are equal to each other. The apertures 91a to 98a on the subpixel electrode 190a and 71a to 78a on the common electrode 270 have approximate inversion symmetry with respect to a central longitudinal line of the subpixel electrode 190a.

Each of the apertures 74a, 75a, 77a, and 78a includes a slanted portion which extends from a portion of the common electrode 270 corresponding to the right side of the subpixel electrode 190a to the upper or lower side of the subpixel electrode 190a, and longitudinal and transverse portions which extend from the ends of the slanted portions along portions of the common electrode 270 corresponding to the sides of the subpixel electrode 190a with an obtuse angle with the slanted portions and overlap with portions of the common electrode 270 corresponding to the sides of the subpixel electrode 190a. Each of the apertures 73a and 76a includes a slanted portion which extends from a portion of the common electrode 270 corresponding to the right side of the subpixel electrode 190a to a portion of the common electrode 270 corresponding to the left side of the subpixel electrode 190a, and a pair of transverse portions which extend from the ends of the slanted portion along portions of the common electrode 270 corresponding to the left and right sides of the subpixel electrode 190a with an obtuse angle with the slanted portion and overlap with portions of the common electrode 270 corresponding to the left and right sides of the subpixel electrode 190a. Each of the central apertures 71a and 72a includes a longitudinal portion which extends along a portion of the common electrode 270 corresponding to the central longitudinal line of the subpixel electrode 190a, a pair of slanted portions which extend from the longitudinal portion to the portion of the common electrode 270 corresponding to the left side of the subpixel electrode 190a, and a pair of transverse portions which extend from the ends of the slanted portions along a portion of the common electrode 270 corresponding to the left side of the subpixel electrode 190a with an obtuse angle with the slanted portions and overlap with a portion of the common electrode 270 corresponding to the sides of the subpixel electrode 190a. As the common electrode 270 may cover substantially an entire surface of the common electrode panel 200, the pattern of apertures described herein may be repeated for each pixel region of the TFT panel 100.

Notches having a shape of a triangle are formed in the slanted portions of the apertures 72a, 73a, 74a, 76a, and 77a. Alternatively, the notches may have a shape of a rectangle, a trapezoid, or a semicircle, and may have a convex or a concave shape. Due to the notches, an alignment direction of the liquid crystal molecules within the liquid crystal layer 3 located within boundaries corresponding to the apertures 72a, 73a, 74a, 76a, and 77a can be determined.

The number of apertures 71a to 78a may vary according to the design factors, and the light-shielding member 220 may overlap with the apertures 71a to 78a to shield light leakage in a vicinity of the apertures 71a to 78a.

Since the same common voltage Vcom is applied to the common electrode 270 and the shielding electrodes 88, no electric field is generated therebetween. Accordingly, the liquid crystal molecules within the liquid crystal layer 3 disposed between the common electrode 270 and the shielding electrodes 88 maintain an initial vertically aligned state, and light incident to the regions cannot transmit.

At least one of the apertures 91a to 98a and 71a to 78a may be replaced with protrusions or recessed portions, and, although a particular shape and arrangement of the apertures 91a to 98a and 71a to 78a has been described for exemplary purposes, the shape and arrangement of the apertures 91a to 98a and 71a to 78a may be modified in alternative embodiments.

On the common electrode 270 and the cover film 250, an alignment film 21 for aligning the liquid crystal layer 3 is coated. The alignment film 21 may be a vertical alignment film.

Polarizing plates 12 and 22 are provided on outer surfaces of the panels 100 and 200. Transmitting axes of the two polarizing plates 12 and 22 are perpendicular to each other, and one of the transmitting axes (or absorbing axes) is parallel to the longitudinal direction. In the case of a reflective type LCD apparatus, one of the two polarizing plates 12 and 22 may be omitted.

The liquid crystal layer 3 has a negative anisotropic permittivity, and the liquid crystal molecules of the liquid crystal layer 3 are aligned so as for major axes thereof to be perpendicular to the surfaces of the two panels 100, 200 when no electric field is applied to the liquid crystal molecules.

When the common voltage Vcom and the data voltage are applied to the common electrode 270 and the subpixel electrode 190a, respectively, an electric field is generated in a direction substantially perpendicular to the surfaces of the panels 100 and 200. The apertures 91a to 98a and 71a to 78a of the electrodes 190 and 270 distort the electric field to generate a horizontal component which is perpendicular to the sides of the apertures 91a to 98a and 71a to 78a.

Accordingly, the electric field is oriented in a direction slanted with respect to a direction perpendicular to the surfaces of the panels 100 and 200.

In response to the electric field, the liquid crystal molecules within the liquid crystal layer 3 have a tendency to change the major axis direction to be perpendicular to the direction of the electric field. At this time, since the electric field in a vicinity of the apertures 91a to 98a and 71a to 78a and the sides of the subpixel electrode 190a has a predetermined angle which is not parallel to the major axis direction of the liquid crystal molecules, the liquid crystal molecules rotate in such a direction that the moving distance on the surface formed by the major axis direction of the liquid crystal molecules and the electric field is short. Therefore, one group of the apertures 91a to 98a and 71a to 78a and the sides of the subpixel electrode 190a divide the region of the liquid crystal layer 3 located on the subpixel electrode 190a into a plurality of domains where the liquid crystal molecules have different tilted angles, so that it is possible to increase a reference viewing angle.

According to an LCD apparatus of the present invention, since the data lines 171b are disposed between a pair of the subpixels PXa and PXb constituting one pixel PX, it is possible to prevent light leakage. In addition, since the two data lines 171a and 171b are separated from each other by subpixels PXa and PXb, it is possible to reduce signal delay or distortion of the data voltages.

Different data voltages which are determined in advance with respect to one input image signal are applied to the pair of subpixel electrodes 190a and 190b, the magnitudes thereof may be determined according to the sizes and shapes of the subpixel electrodes 190a and 190b, and the polarities thereof may be determined as needed.

The areas of the subpixel electrodes 190a and 190b may be different from each other.

On the other hand, when two subpixels divided from one pixel are connected to two gate lines but only one data line, the gate signals and the data signals must be driven at a frequency (for example, 120 Hz) twice as high as a frequency (for example, 60 Hz) of the input image signal. Therefore, since the time for driving the TFTs of one row of pixels decreases by half, a driving margin and a charging rate for such a configuration may be reduced. However, according to a structure of the present invention which includes two data lines connected to each pixel, since the gate signals and the data signals can be driven at a frequency equal to the frequency (60 Hz) of the input image signal, it is possible to prevent the driving margin and the charge rate from being reduced.

As described above, according to the present invention, one pixel is divided into a pair of subpixels, and the subpixels are connected to two different data lines. Accordingly, separate data voltages with desired levels can be applied to the two subpixels within each pixel, so that it is possible to improve visibility, increase an aperture ratio, and improve transmittance. In addition, since the areas of the subpixels may be designed to be different from each other, it is possible to improve side visibility. In addition, since the LCD apparatus can be driven at a frequency equal to a frequency of an input image signal, it is possible to prevent a driving margin and a charging rate from being reduced.

Although the exemplary embodiments of the present invention have been described, the present invention is not limited to the embodiments, but may be modified in various forms without departing from the scope of the appended claims, the detailed description, and the accompanying drawings of the present invention. Therefore, it is natural that such modifications belong to the scope of the present invention.

What is claimed is:

1. A liquid crystal display apparatus, comprising:
a plurality of pixels, each having first and second subpixels, the first subpixel and the second subpixel in one pixel, the first subpixel including a first subpixel electrode and the second subpixel including a second subpixel electrode;
a gate line which is connected to the first and second subpixels and transmits a gate signal to the first and second subpixels;
a storage line including a storage electrode;
a first data line which intersects the gate line and transmits a first data voltage to the first subpixel; and
a second data line which intersects the gate line transmits a second data voltage to the second subpixel,
wherein
the storage electrode comprises a first region spaced apart from the storage line, and a second region extended from the storage line in the same direction as the first data line and the second data line and disposed between the first region and the storage line,
the first subpixel including the first subpixel electrode, and the first subpixel electrode are connected to a first drain electrode through a first contact hole,
the second subpixel including the second subpixel electrode, and the second subpixel electrode are connected to a second drain electrode through a second contact hole,
at least one of the first subpixel electrode and the second subpixel electrode comprises a plurality of domains where liquid crystal molecules have different tilted angles, and the plurality of domains have an inversion symmetry with respect with the storage line,
at least one of the first subpixel electrode and the second subpixel electrode has a first domain extending in a first direction forming about 45 degrees with the gate line and a second domain extending in a second direction forming about 135 degrees with the gate line, and the first domain and the second domain face each other with respect to the storage line,
at least one of the first drain electrode and the second drain electrode comprises a first portion extending in the same direction as the gate line, a second portion projected from the first portion and extending in the same direction as the first data line and the second data line, and a third portion projected from the second portion and overlapping the storage electrode, and
at least one of the first contact hole and the second contact hole overlaps the storage electrode first region spaced apart from the storage line and overlapped by the drain electrode third portion.

2. The liquid crystal display apparatus of claim 1, wherein the first subpixel includes a first switching device including a first gate electrode, a first source electrode and the first drain electrode, and
the second subpixel includes a second switching device including a second gate electrode, a second source electrode and the second drain electrode,
wherein the first gate electrode, the first source electrode and the first drain electrode are symmetric with the second gate electrode, the second source electrode and the second drain electrode, respectively.

3. The liquid crystal display apparatus of claim 2, wherein at least one of the first and second subpixel electrodes has an aperture.

4. The liquid crystal display apparatus of claim 2, wherein the first subpixel and the second subpixel further comprise a common electrode facing the first and second subpixel electrodes.

5. The liquid crystal display apparatus of claim 4, wherein the common electrode has an aperture or a protrusion.

6. The liquid crystal display apparatus of claim 2, further comprising a shielding electrode including a transparent conductive layer, wherein at least a portion of the shielding electrode overlaps the first and second data lines and is electrically insulated from the first and second data lines.

7. The liquid crystal display apparatus of claim 2, wherein at least one of the first and second data lines is disposed between the first and second subpixel electrodes.

8. The liquid crystal display apparatus of claim 7, wherein a ratio of a transverse length and a longitudinal length of the pixel is substantially equal to 1:3.

9. The liquid crystal display apparatus of claim 8, wherein the first subpixel and the second subpixel are arranged in a transverse direction and a transverse length of the first subpixel is different from a transverse length of the second subpixel.

10. The liquid crystal display apparatus of claim 7, further comprising first and second color filters facing the first and second subpixel electrodes respectively, wherein the first and second color filters have a same color.

11. The liquid crystal display apparatus of claim 2, wherein the first data line and the second data line are disposed at opposite sides of the pixel.

12. The liquid crystal display apparatus of claim 11, wherein the first and second data voltages have a same polarity.

13. The liquid crystal display apparatus of claim 11, wherein the first and second data voltages have opposite polarities.

14. The liquid crystal display apparatus of claim 2, wherein the first data line and the second data line are disposed adjacent a same side of the pixel.

15. The liquid crystal display apparatus of claim 14, wherein the first and second data voltages have a same polarity.

16. The liquid crystal display apparatus of claim 14, further comprising a bridge wire connected between the second data line and the second switching device,
wherein the second data line is farther from the pixel than the first data line.

17. The liquid crystal display apparatus of claim 16, wherein
the bridge wire and the gate line comprise a same metal layer, and
the bridge wire are connected to a portion of the second data line and an end of the second switching device through conductive members comprising a same metal layer as the first and second subpixel electrodes.

18. The liquid crystal display apparatus of claim 16, wherein the second data line includes a first portion and a second portion separated from each other, ends of the first and second portions of the second data line overlapping a first end portion of the bridge wire.

19. The liquid crystal display apparatus of claim 18, wherein a second end portion of the bridge wire is overlapped by a source electrode of the second switching device.

20. The liquid crystal display apparatus of claim 2, wherein the pixel has a substantially rectangular shape, and the first and second subpixels have a substantially non-rectangular shape.

21. The liquid crystal display apparatus of claim 20, wherein the first subpixel electrode has a shape nested within a shape of the second subpixel electrode, and a gap separates the first subpixel electrode from the second subpixel electrode.

22. The liquid crystal display apparatus of claim 2, wherein
both the first and second drain electrodes comprise the first portion extending in the same direction as the gate line, the second portion projected from the first portion and extending in the same direction as the first data line and the second data line, and the third portion projected from the second portion and overlapping the storage electrode,
the first contact hole overlaps the storage line overlapped by the first drain electrode third portion, and
the second contact hole overlaps the storage electrode first portion spaced apart from the storage line and overlapped by the second drain electrode third portion.

23. The liquid crystal display apparatus of claim 1, wherein the liquid crystal display apparatus is driven at a same frequency as a frequency of an input image signal of the image information.

24. The liquid crystal display apparatus of claim 1, further comprising:
a signal controller processing the image information and generating first and second image signals; and
a data driver applying the first and second data voltages corresponding to the first and second image signals to the first and second data lines, respectively.

25. The liquid crystal display apparatus of claim 1, further comprising a plurality of pixels, and a pair of data lines positioned between each pair of adjacent pixels.

26. The liquid crystal display apparatus of claim 1, wherein
the first data voltage and the second data voltage have a different magnitude and a same polarity and are obtained from a single image information.

27. The liquid crystal display apparatus of claim 26, wherein the polarities of the data voltages applied to the first and second subpixels are inverted for every row of pixels.

28. The liquid crystal display apparatus of claim 26, wherein the polarities of the data voltages applied to the first and second subpixels are inverted for every column of pixels.

29. The liquid crystal display apparatus of claim 1, wherein the first and second data lines for each pixel are disposed at opposite sides of each pixel.

30. The liquid crystal display apparatus of claim 1, wherein the first and second data lines for each pixel are disposed at a same side of each pixel.

31. The liquid crystal display apparatus of claim 1, wherein one of the first and second data lines is disposed between the first and second subpixels of each pixel.

32. The liquid crystal display apparatus of claim 1, further comprising a shielding electrode including a transparent conductive layer, wherein at least a portion of the shielding electrode overlaps the first and second data lines and is electrically insulated from the first and second data lines.

33. The liquid crystal display apparatus of claim 32, wherein
the first and second data lines are between adjacent pixels, and
the first subpixel electrode and the second subpixel electrode are on a same side of the gate line in the one pixel.

34. The liquid crystal display apparatus of claim 1, wherein
the first and second data lines are between adjacent pixels, and
the first subpixel electrode and the second subpixel electrode are on a same side of the gate line in the one pixel.

35. The liquid crystal display apparatus of claim 1, wherein an area of the first subpixel electrode is different from an area of the second subpixel electrode.

36. The liquid crystal display apparatus of claim 34, wherein the first and second data lines for each pixel are disposed at a same side of each pixel.

37. The liquid crystal display apparatus of claim 34, wherein one of the first and second data lines is disposed between the first and second subpixels of each pixel.

38. The liquid crystal display apparatus of claim 1, further comprising a liquid crystal layer disposed in the pixel and including a plurality of liquid crystal molecules,
   wherein the liquid crystal molecules are vertically aligned when no electrical field is applied to the liquid crystal layer.

39. The liquid crystal display apparatus of claim 1, wherein the planar shape of the first subpixel electrode is different from that of the second subpixel electrode.

40. The liquid crystal display apparatus of claim 1, further comprising a insulating layer between the first drain electrode and the first subpixel electrode, and between the second drain electrode and the second subpixel electrode,
   wherein
      the first contact hole and the second contact hole are each extended through the insulating layer, and
      the insulating layer comprises an organic layer.

41. The liquid crystal display apparatus of claim 1, wherein the width of the drain electrode third portion is larger than that of the drain electrode second portion.

42. The liquid crystal display apparatus of claim 41, wherein the storage electrode overlaps the drain electrode second and third portions.

43. The liquid crystal display apparatus of claim 1, wherein the storage electrode overlaps the drain electrode second and third portions.

44. The liquid crystal display apparatus of claim 1, wherein
   both of the first subpixel electrode and the second subpixel electrode in the one pixel comprises the plurality of domains where liquid crystal molecules have different tilted angles, and
   the plurality of domains within each of the first subpixel electrode and the second subpixel electrode have an inversion symmetry with respect with the storage line.

* * * * *